US011998499B2

(12) United States Patent
Tessmer

(10) Patent No.: US 11,998,499 B2
(45) **Date of Patent: *Jun. 4, 2024**

(54) POWERED SIDE RAIL FOR A PATIENT SUPPORT APPARATUS

(71) Applicant: Stryker Corporation, Kalamazoo, MI (US)

(72) Inventor: Brian J. Tessmer, Mattawan, MI (US)

(73) Assignee: Stryker Corporation, Kalamazoo, MI (US)

( * ) Notice: Subject to any disclaimer, the term of this patent is extended or adjusted under 35 U.S.C. 154(b) by 233 days.

This patent is subject to a terminal disclaimer.

(21) Appl. No.: 17/242,907

(22) Filed: Apr. 28, 2021

(65) Prior Publication Data

US 2021/0244588 A1 Aug. 12, 2021

Related U.S. Application Data

(63) Continuation of application No. 15/380,211, filed on Dec. 15, 2016, now Pat. No. 11,020,297.

(Continued)

(51) Int. Cl.
*A61G 7/05* (2006.01)
*A61G 7/018* (2006.01)

(52) U.S. Cl.
CPC .......... *A61G 7/0516* (2016.11); *A61G 7/0509* (2016.11); *A61G 7/018* (2013.01); *A61G 2203/30* (2013.01); *A61G 2203/32* (2013.01); *A61G 2203/44* (2013.01); *A61G 2203/46* (2013.01)

(58) Field of Classification Search
CPC .... A61G 7/018; A61G 7/0509; A61G 7/0516; A61G 2203/30; A61G 2203/32; A61G 2203/44; A61G 2203/46
See application file for complete search history.

(56) References Cited

U.S. PATENT DOCUMENTS 4,325,061 A 4/1982 Wolar
4,407,030 A 10/1983 Elliott (Continued)

FOREIGN PATENT DOCUMENTS

CA 2869804 A1 10/2013
GB 905708 A 9/1962

(Continued)

OTHER PUBLICATIONS

KR-20130076922-A English Translation (Year: 2013).*

(Continued)

*Primary Examiner* — Eric J Kurilla
*Assistant Examiner* — Amanda L Bailey
(74) *Attorney, Agent, or Firm* — Howard & Howard Attorneys PLLC

(57) ABSTRACT

A patient support system comprises a patient support apparatus for patients. The patient support apparatus comprises a base and a patient support surface supported by the base. The patient support apparatus also comprises side rails that move between raised and lowered positions. One or more actuators are coupled to each of the side rails. A controller communicates with the actuators to raise and lower the side rails, either without any manual assistance from the user, or with manual assistance from the user.

16 Claims, 28 Drawing Sheets

Related U.S. Application Data

(60) Provisional application No. 62/270,715, filed on Dec. 22, 2015.

(56) References Cited

U.S. PATENT DOCUMENTS

| | | | | |
|---|---|---|---|---|
| 4,534,077 | A | 8/1985 | Martin | |
| 5,069,000 | A | 12/1991 | Zuckerman | |
| 5,156,166 | A | 10/1992 | Sebring | |
| 5,220,698 | A | 6/1993 | Hannant | |
| 5,317,769 | A | 6/1994 | Weismiller et al. | |
| 5,481,769 | A | 1/1996 | Schneider | |
| 5,715,548 | A | 2/1998 | Weismiller et al. | |
| 6,201,481 | B1 | 3/2001 | Bellingroth | |
| 6,555,982 | B2 | 4/2003 | Tyckowski | |
| 6,640,360 | B2 | 11/2003 | Hornbach et al. | |
| 6,652,033 | B2 | 11/2003 | Satoh | |
| 6,677,720 | B2 | 1/2004 | Fraser | |
| 7,200,882 | B2 | 4/2007 | Heimbrock | |
| 7,472,437 | B2 | 1/2009 | Riley et al. | |
| 7,570,152 | B2 | 8/2009 | Smith et al. | |
| 7,676,866 | B2 | 3/2010 | Toms et al. | |
| 7,712,166 | B2 | 5/2010 | Stryker et al. | |
| 7,761,939 | B2 | 7/2010 | Wiggins et al. | |
| 7,784,125 | B2 | 8/2010 | Morin et al. | |
| 7,834,768 | B2 | 11/2010 | Dixon et al. | |
| 7,914,076 | B2 | 3/2011 | Broering et al. | |
| 7,926,131 | B2 | 4/2011 | Menkedick et al. | |
| 7,978,084 | B2 | 7/2011 | Dixon et al. | |
| 8,039,766 | B2 | 10/2011 | Flanagan | |
| 8,104,118 | B2 * | 1/2012 | Derenne | A61G 7/0513 5/430 |
| 8,134,473 | B2 | 3/2012 | Roussy | |
| 8,239,986 | B2 | 8/2012 | Heimbrock et al. | |
| 8,258,944 | B2 | 9/2012 | Riley et al. | |
| 8,334,779 | B2 | 12/2012 | Zerhusen et al. | |
| 8,502,663 | B2 | 8/2013 | Riley et al. | |
| 8,514,093 | B2 | 8/2013 | Roussy | |
| 8,756,078 | B2 | 6/2014 | Collins, Jr. et al. | |
| 8,776,286 | B1 * | 7/2014 | Edgerton | A61G 7/0516 5/430 |
| 8,866,610 | B2 | 10/2014 | Riley et al. | |
| 8,959,681 | B2 | 2/2015 | Richards | |
| 8,984,685 | B2 | 3/2015 | Robertson et al. | |
| 9,009,893 | B2 | 4/2015 | Kramer et al. | |
| 9,182,750 | B2 | 11/2015 | Rawls-Meehan | |
| 9,228,885 | B2 | 1/2016 | Zerhusen et al. | |
| 9,517,171 | B2 | 12/2016 | Andersen et al. | |
| 9,569,591 | B2 | 2/2017 | Vanderpohl, III | |
| 9,655,796 | B2 | 5/2017 | Riley et al. | |
| 2004/0158923 | A1 | 8/2004 | Perez et al. | |
| 2005/0160527 | A1 * | 7/2005 | Morin | A61G 7/0514 5/430 |
| 2006/0117481 | A1 * | 6/2006 | Stryker | A61G 7/0514 5/430 |
| 2007/0157385 | A1 * | 7/2007 | Lemire | A61M 5/1415 5/618 |
| 2008/0041282 | A1 | 2/2008 | Goschy et al. | |
| 2009/0119839 | A1 * | 5/2009 | Guguin | A61G 7/0513 5/430 |
| 2009/0139028 | A1 | 6/2009 | Morin et al. | |
| 2012/0124743 | A1 | 5/2012 | Hensley et al. | |
| 2013/0086746 | A1 | 4/2013 | Vanderpohl | |
| 2013/0227787 | A1 * | 9/2013 | Herbst | A61G 7/1067 5/618 |
| 2014/0080413 | A1 | 3/2014 | Hayes et al. | |
| 2014/0297327 | A1 | 10/2014 | Heil et al. | |
| 2014/0310876 | A1 | 10/2014 | Roussy et al. | |
| 2014/0352067 | A1 | 12/2014 | Riley et al. | |
| 2015/0060162 | A1 | 3/2015 | Goffer | |
| 2015/0164722 | A1 | 6/2015 | Roussy et al. | |
| 2015/0224005 | A1 | 8/2015 | Kramer et al. | |
| 2015/0257952 | A1 | 9/2015 | Zerhusen et al. | |
| 2016/0128610 | A1 | 5/2016 | Kostic et al. | |
| 2016/0166453 | A1 | 6/2016 | Furman et al. | |
| 2016/0193095 | A1 | 7/2016 | Roussy et al. | |
| 2016/0213538 | A1 | 7/2016 | Salus | |
| 2017/0020757 | A1 | 1/2017 | Tessmer et al. | |
| 2017/0172828 | A1 | 6/2017 | Zerhusen et al. | |
| 2017/0172829 | A1 | 6/2017 | Tessmer et al. | |
| 2017/0202717 | A1 | 7/2017 | Andersen et al. | |

FOREIGN PATENT DOCUMENTS

| | | | | |
|---|---|---|---|---|
| KR | 2013076922 | A | 7/2013 | |
| KR | 20130076922 | A * | 9/2013 | A61G 7/05 |
| WO | 0225636 | A2 | 3/2002 | |
| WO | WO-2013152438 | A1 * | 10/2013 | A61G 7/0507 |

OTHER PUBLICATIONS

English language abstract and machine-assisted translation for KR2013076922 extracted from espacenet.com on Sep. 14, 2017; 5 pages.

Stryker, "Modular Patient System (MPS) 3000 Bed Maintenance Manual", 3000-000-020 Rev B, Mar. 1994, 249 pages.

* cited by examiner

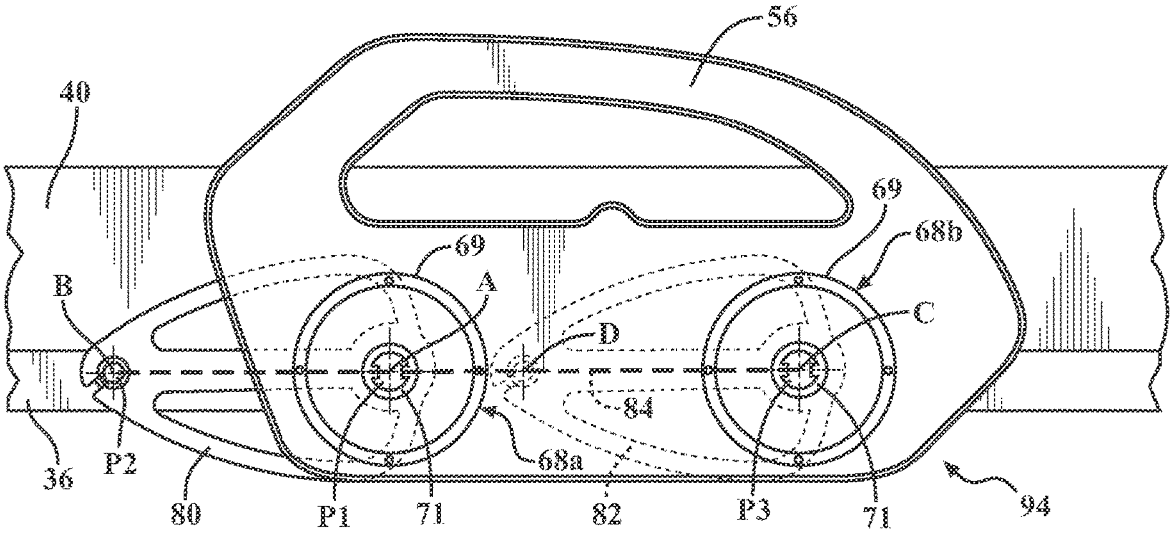
FIG. 5C
FIG. 5D
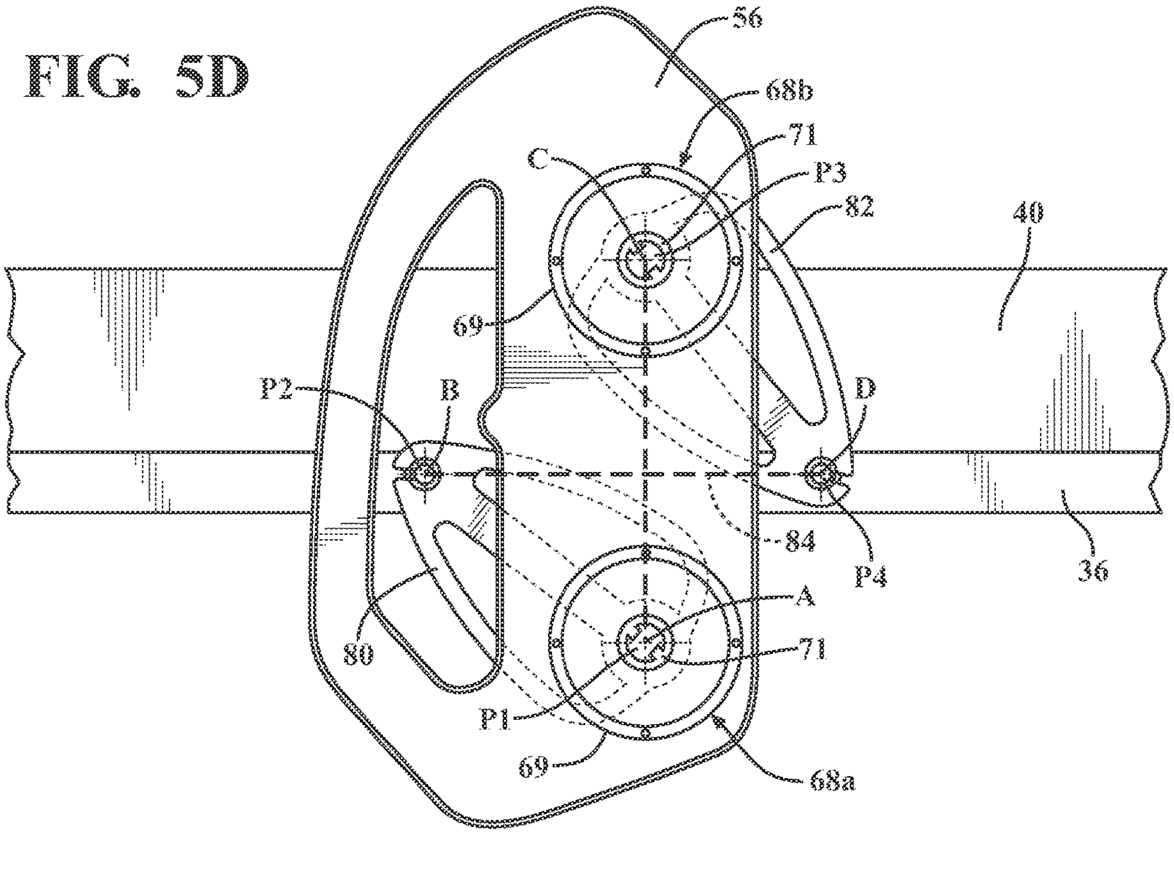

POWERED SIDE RAIL FOR A PATIENT SUPPORT APPARATUS

CROSS-REFERENCE TO RELATED APPLICATIONS

This application is a continuation of U.S. patent application Ser. No. 15/380,211, filed on Dec. 15, 2016, which claims priority to and the benefit of U.S. Provisional Patent Application No. 62/270,715, filed on Dec. 22, 2015, the entire contents and disclosure of each of which are hereby incorporated by reference.

BACKGROUND

Patient support systems facilitate care of patients in a health care setting. Patient support systems comprise patient support apparatuses such as, for example, hospital beds and stretchers. Conventional patient support apparatuses comprise a base and a patient support surface upon which the patient is supported. Often, these patient support apparatuses also have one or more side rails that are movable between a raised position in which the side rail blocks egress of the patient from the patient support apparatus, a lowered position in which the patient is able to egress from the patient support apparatus, and an intermediate position between the raised position and the lowered position. Typically, in order to raise or lower one of the side rails, a user must manually release a latch that holds the side rail in its current position and then the user must manually raise or lower the side rail. Repetitive raising and lowering of side rails, such as by caregivers, can be physically demanding. Additionally, in some cases, the limited positions in which the side rail can be placed may be insufficient for caregivers.

A patient support system designed to overcome one or more of the aforementioned challenges is desired.

BRIEF DESCRIPTION OF THE DRAWINGS

FIG. 5C is an elevational view of the side rail of FIG. 5A at a toggle point.

FIG. 5D is an elevational view of the side rail of FIG. 5A in a re-oriented position.

DETAILED DESCRIPTION

Figure 1:
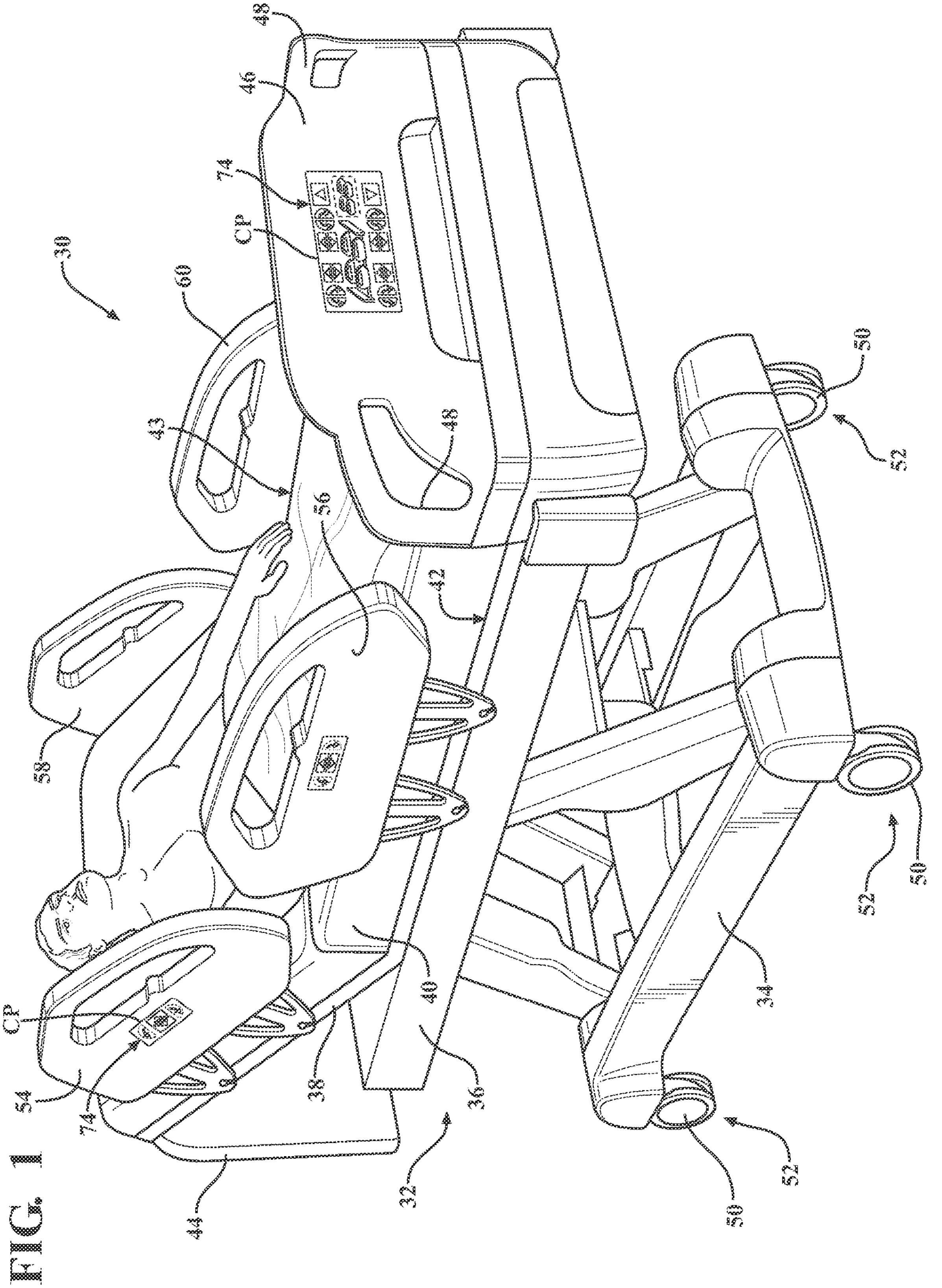
FIG. 1 is a perspective view of a patient support apparatus.

Referring to FIG. 1, a patient support system comprising a patient support apparatus 30 is shown for supporting a patient in a health care setting. The patient support apparatus 30 illustrated in FIG. 1 comprises a hospital bed. In other embodiments, however, the patient support apparatus 30 may comprise a stretcher, cot, table, wheelchair, or similar apparatus utilized in the care of a patient.

A support structure 32 provides support for the patient. The support structure 32 illustrated in FIG. 1 comprises a base 34 and an intermediate frame 36. The intermediate frame 36 is spaced above the base 34. The support structure 32 also comprises a patient support deck 38 disposed on the intermediate frame 36. The patient support deck 38 comprises several sections, some of which articulate (e.g., pivot) relative to the intermediate frame 36, such as a fowler section, a seat section, a thigh section, and a foot section. The patient support deck 38 provides a patient support surface 42 upon which the patient is supported.

A mattress 40 is disposed on the patient support deck 38. The mattress 40 comprises a secondary patient support surface 43 upon which the patient is supported. The base 34, intermediate frame 36, patient support deck 38, and patient support surfaces 42, 43 each have a head end and a foot end corresponding to designated placement of the patient's head and feet on the patient support apparatus 30. The construction of the support structure 32 may take on any known or conventional design, and is not limited to that specifically set forth above. In addition, the mattress 40 may be omitted in certain embodiments, such that the patient rests directly on the patient support surface 42.

A headboard 44 and a footboard 46 are coupled to the intermediate frame 36. In other embodiments, when the headboard 44 and footboard 46 are included, the headboard 44 and footboard 46 may be coupled to other locations on the patient support apparatus 30, such as the base 34. In still other embodiments, the patient support apparatus 30 does not include the headboard 44 and/or the footboard 46.

Caregiver interfaces 48, such as handles, are shown integrated into the footboard 46 to facilitate movement of the patient support apparatus 30 over floor surfaces. Additional caregiver interfaces 48 may be integrated into the headboard 44 and/or other components of the patient support apparatus 30. The caregiver interfaces 48 are graspable by the caregiver to manipulate the patient support apparatus 30 for movement.

Wheels 50 are coupled to the base 34 to facilitate transport over the floor surfaces. The wheels 50 are arranged in each of four quadrants of the base 34 adjacent to corners of the base 34. In the embodiment shown, the wheels 50 are caster wheels able to rotate and swivel relative to the support structure 32 during transport. Each of the wheels 50 forms part of a caster assembly 52. Each caster assembly 52 is mounted to the base 34. It should be understood that various configurations of the caster assemblies 52 are contemplated. In addition, in some embodiments, the wheels 50 are not caster wheels and may be non-steerable, steerable, non-powered, powered, or combinations thereof. Additional wheels are also contemplated. For example, the patient support apparatus 30 may comprise four non-powered, non-steerable wheels, along with one or more powered wheels. In some cases, the patient support apparatus 30 may not include any wheels.

Side rails 54, 56, 58, 60 are coupled to the support structure 32, such as by being coupled directly to the intermediate frame 36 and/or the patient support deck 38. The side rails 54, 56, 58, 60 are thus supported by the base 34. A first side rail 54 is positioned at a right head end of the patient support apparatus 30. The first side rail 54 is coupled to the fowler section of the patient support deck 38. A second side rail 56 is positioned at a right foot end of patient support apparatus 30. The second side rail 56 is coupled to the intermediate frame 36. A third side rail 58 is positioned at a left head end of the patient support apparatus 30. The third side rail 58 is coupled to the fowler section of the patient support deck 38. A fourth side rail 60 is positioned at a left foot end of the patient support apparatus 30. The fourth side rail 60 is coupled to the intermediate frame 36.

It should be appreciated that the side rails 54, 56, 58, 60 may be mounted to other parts of the patient support apparatus 30. In some cases, all of the side rails 54, 56, 58, 60 are coupled to the intermediate frame 36. In other cases, all of the side rails 54, 56, 58, 60 are coupled to the patient support deck 38. If the patient support apparatus 30 is a stretcher or a cot, there may be fewer side rails.

For ease of description, reference hereinafter may be made to one side rail, namely the second side rail 56, with the understanding that the following description applies equally to any of the side rails 54, 56, 58, 60. Furthermore, shapes and/or sizes of the side rails 54, 56, 58, 60 may vary depending on whether the side rail is a head end side rail or foot end side rail. In some cases, each of the side rails 54, 56, 58, 60 may have a different shape and/or size. In other cases, each of the side rails 54, 56, 58, 60 have the same shape and/or size. The side rails 54, 56, 58, 60 may be formed of metal, plastic, or other suitable materials and may be formed by molding, casting, or other suitable methods. The side rails 54, 56, 58, 60 may be formed in one piece or in separate pieces connected together.

Figure 2:
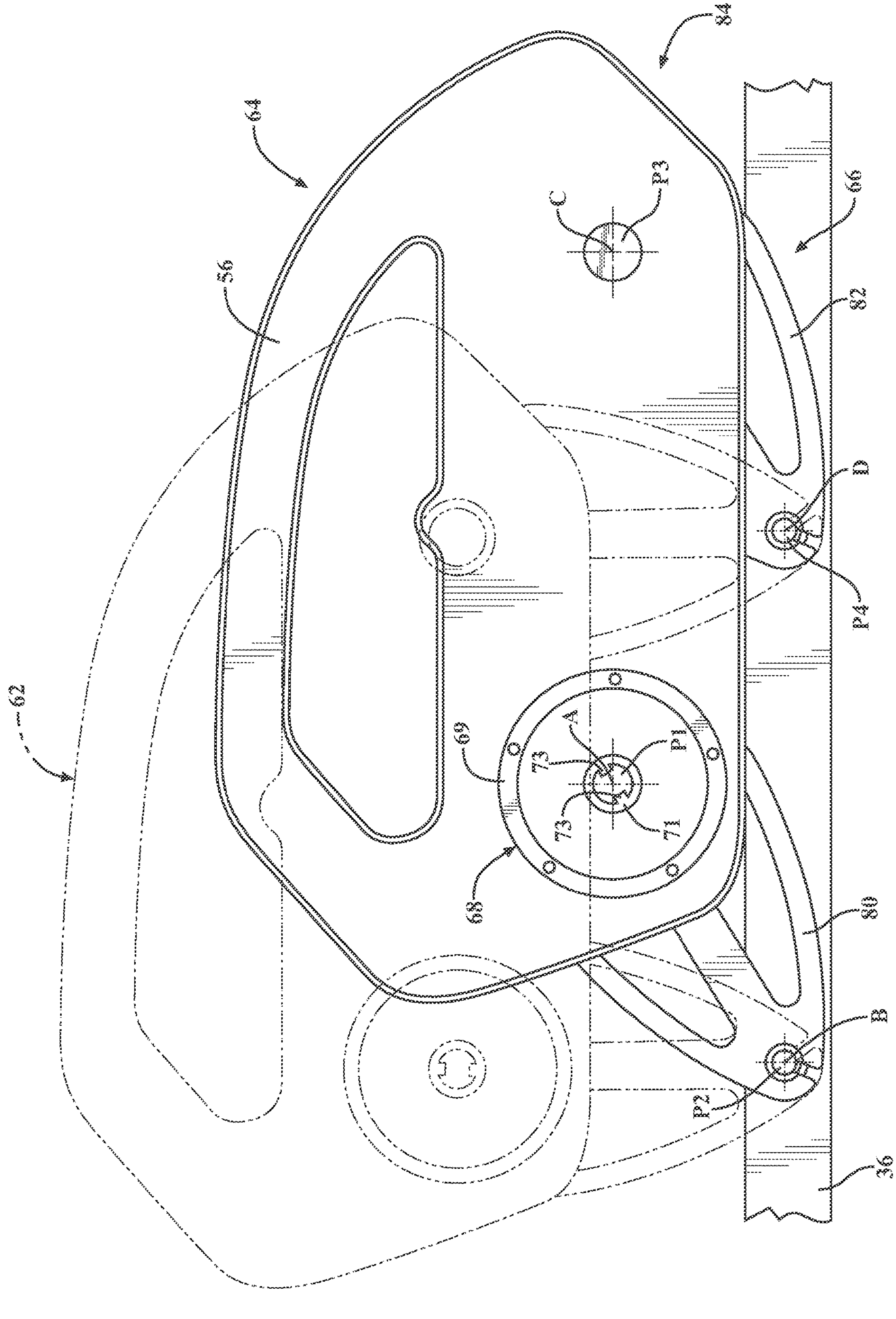
FIG. 2 is an elevational view of a side rail and support arm assembly actuated by an actuator.

As shown in FIG. 2, in one embodiment, the side rail 56 is movable relative to the intermediate frame 36 between a first position 62 and a second position 64. In some cases, the first position 62 corresponds to a raised position and the second position 64 corresponds to a lowered position. In some cases, the first position 62 is the highest position of the side rail 56 relative to the intermediate frame 36 and the second position 64 is the lowest position of the side rail 56 relative to the intermediate frame 36. In other cases, the first position 62 and the second position 64 are merely two different positions of the side rail 56. The side rail 56 may also be movable to any position between, before, or beyond the first position 62 and the second position 64. In the embodiment shown in FIG. 2, the side rail 56 is arranged so that the side rail 56 is kept in the same orientation as the side rail 56 moves between the first position 62 and the second position 64. In other embodiments described further below, the side rail 56 may change orientation.

A support arm assembly 66 couples the side rail 56 to the intermediate frame 36. In the embodiment shown in FIGS. 2 and 3, the support arm assembly 66 comprises a first support arm 80 and a second support arm 82. The support arms 80, 82 are separate and spaced from one another. In other embodiments, the support arm assembly 66 may comprise only a single support arm or may comprise additional support arms. The support arms 80, 82 may be any shape, size, and/or configuration. In the version shown, each of the support arms 80, 82 comprise three arm segments integrated together. In other embodiments, fewer or more arm segments may be present. In still further embodiments, the support arms 80, 82 may be solid or hollow pieces of material having any shape and/or size.

The first support arm 80 is pivotally coupled at one end to the side rail 56 about a first side rail pivot axis A. The first support arm 80 is pivotally coupled at an opposing end to the intermediate frame 36 about a first frame pivot axis B. The second support arm 82 is pivotally coupled at one end to the side rail 56 about a second side rail pivot axis C. The second support arm 82 is pivotally coupled at an opposing end to the intermediate frame 36 about a second frame pivot axis D.

Pivot members P1, P2, P3, P4 pivotally couple the support arms 80, 82 to the side rail 56 and to the intermediate frame 36 at the pivot axes A, B, C, D. The pivot members P1, P2, P3, P4 may comprise pivot shafts, pivot pins, and the like. Any suitable device may be employed to pivotally couple the support arms 80, 82 to the side rail 56 and to the intermediate frame 36. In the embodiment shown in FIGS. 2 and 3, the pivot members P1, P2, P3, P4 comprise a first side rail pivot member P1, a first frame pivot member P2, a second side rail pivot member P3, and a second frame pivot member P4.

The first side rail pivot member P1 pivotally couples the first support arm 80 to the side rail 56 about the first side rail pivot axis A. The first side rail pivot member P1 may be fixed to the first support arm 80 to move with the first support arm 80, including during movement with respect to the first side rail pivot axis A. The first side rail pivot member P1 may also be fixed to the side rail 56 such that the first support arm 80 pivots about the first side rail pivot member P1 during pivoting about the first side rail pivot axis A.

The first frame pivot member P2 pivotally couples the first support arm 80 to the intermediate frame 36 about the first frame pivot axis B. The first frame pivot member P2 may be fixed to the first support arm 80 to move with the first support arm 80, including during movement about the first frame pivot axis B. The first frame pivot member P2 may also be fixed to the intermediate frame 36 such that the first support arm 80 pivots about the first frame pivot member P2 during pivoting about the first frame pivot axis B.

The second side rail pivot member P3 pivotally couples the second support arm 82 to the side rail 56 about the second side rail pivot axis C. The second side rail pivot member P3 may be fixed to the second support arm 82 to move with the second support arm 82, including during movement with respect to the second side rail pivot axis C. The second side rail pivot member P3 may also be fixed to the side rail 56 such that the second support arm 82 pivots about the second side rail pivot member P3 during pivoting about the second side rail pivot axis C.

The second frame pivot member P4 pivotally couples the second support arm 82 to the intermediate frame 36 about the second frame pivot axis D. The second frame pivot member P4 may be fixed to the second support arm 82 to move with the second support arm 82, including during movement about the second frame pivot axis D. The second frame pivot member P4 may also be fixed to the intermediate frame 36 such that the second support arm 82 pivots about the second frame pivot member P4 during pivoting about the second frame pivot axis D.

Figure 3:
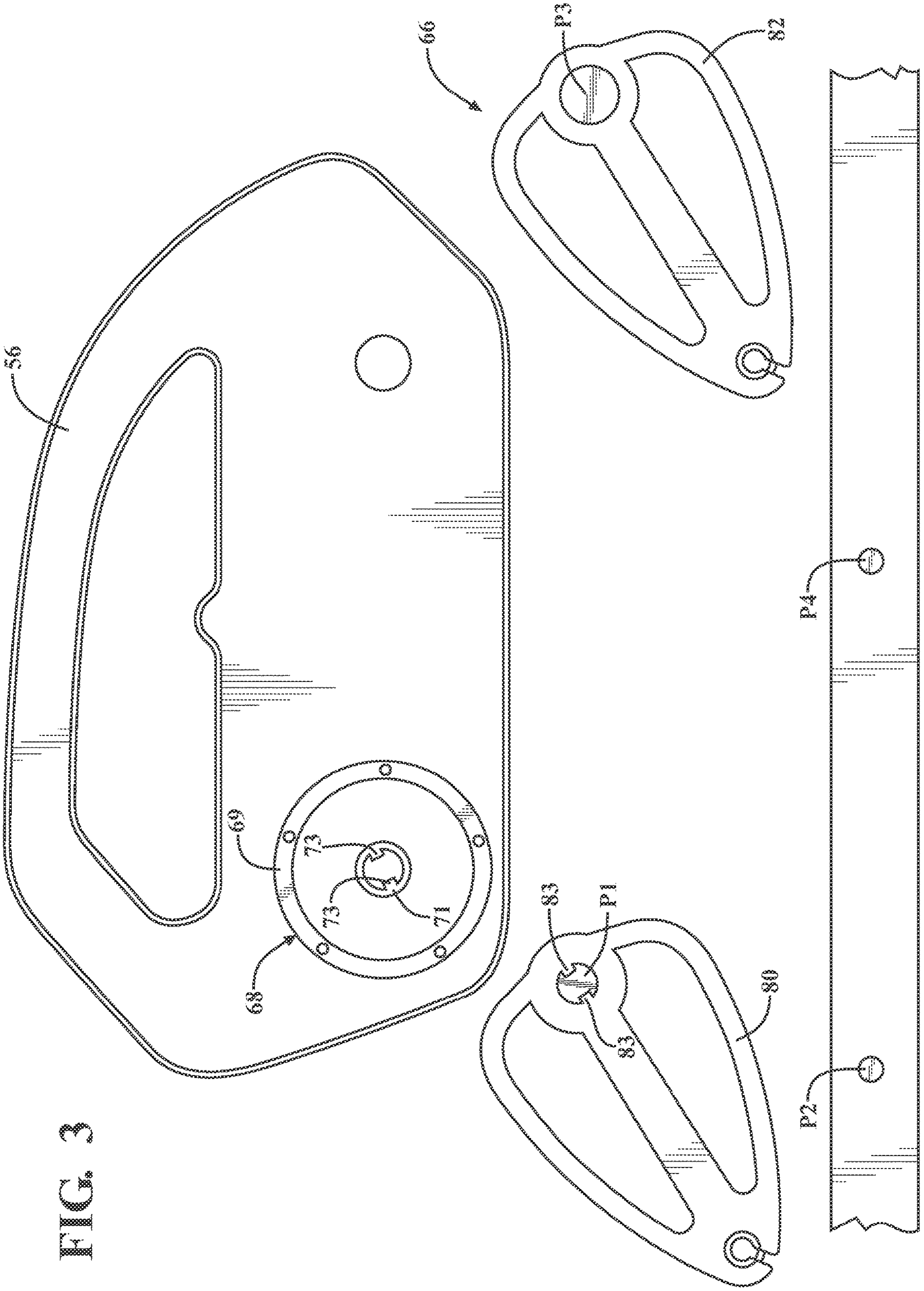
FIG. 3 is an exploded view of the side rail and support arm assembly of FIG. 2.

In the embodiment shown in FIGS. 2 and 3, by forming pivotal connections at the pivot axes A, B, C, D, the support arms 80, 82, the intermediate frame 36, and the side rail 56 form a four bar mechanism 84. In this four bar mechanism 84, the intermediate frame 36 generally acts as a fixed support structure such that, when raising and lowering the side rail 56, the intermediate frame 36 is stationary (unless being lifted or lowered itself), and the support arms 80, 82 and the side rail 56 move relative to the intermediate frame 36. In other embodiments, of course, the intermediate frame 36 may move simultaneously with movement of the support arms 80, 82 and the side rail 56. In the version shown, a distance between the first side rail pivot axis A and the first frame pivot axis B is the same as a distance between the second side rail pivot axis C and the second frame pivot axis D. As a result, the orientation of the side rail 56 can be maintained throughout the range of motion of the side rail 56 from the first position 62 to the second position 64. In other embodiments, these distances may be different.

An actuator 68 is coupled to the support arm assembly 66 to move the side rail 56 to the first position 62, the second position 64, and any position therebetween. In some cases, the actuator 68 is configured to move the side rail 56 without any assistance from the user. In other cases, the actuator 68 merely provides assistance to the user.

In the embodiment of FIGS. 2 and 3, the actuator 68 has a housing 69 that is fixed to the side rail 56. The actuator 68 further has a drive rotor 71 that rotates relative to the housing 69. The drive rotor 71 has a pair of opposing drive features, such as keys 73, to directly engage the first side rail pivot member P1. Thus, the actuator 68 in this embodiment lacks a separate drive shaft, although separate drive shafts may be present in other embodiments. More specifically, the first side rail pivot member P1 has a pair of keyways 83 so that the first side rail pivot member P1 can be driven by the drive rotor 71 of the actuator 68. In the version shown, the first side rail pivot member P1 is fixed to the first support arm 80 so that rotation of the drive rotor 71 results in raising or lowering of the side rail 56 relative to the intermediate frame 36.

The actuator 68 may be coupled to the support arm assembly 66 in any manner suitable to move the side rail 56. In other words, the actuator 68 could be arranged in any manner suitable to pivot the support arms 80, 82 about the pivot axes A, B, C, D to move the side rail 56 clockwise or counterclockwise. For example, the drive rotor 71 may directly or indirectly engage either of the support arms 80, 82, or any of the pivot members P1, P2, P3, P4, such as when the pivot members P1, P2, P3, P4 are fixed to the support arms 80, 82, to raise and lower the side rail 56.

The actuator 68 may be mounted to the side rail 56 or to the intermediate frame 36 to engage the first support arm 80 and pivot the first support arm 80 about the first side rail pivot axis A and about the first frame pivot axis B. The actuator 68 may also be mounted to the side rail 56 or to the intermediate frame 36 to engage the second support arm 82 and pivot the second support arm 82 about the second side rail pivot axis C and the second frame pivot axis D. In one embodiment, the side rail 56 comprises an interior and the actuator 68 is at least partially disposed within the interior. In another embodiment, the actuator 68 is disposed outside of the side rail 56. In other embodiments, the side rail 56 may comprise a plug-and-play port for receiving the actuator 68 to convert a manual side rail into a powered side rail.

The actuator 68 may comprise an electric actuator, a hydraulic actuator, or a pneumatic actuator. The actuator 68 may comprise a rotary actuator, a linear actuator, or any other suitable actuators for moving the side rail 56. In the embodiments shown herein, the actuator 68 is an electrically-powered rotary motor. The actuators 68 may comprise DC motors, reversible motors, brushless motors, stepper motors, 3-phase motors, motors with position and/or speed feedback, combinations thereof, or other types of motors. The actuators 68 may be variable speed and capable of raising and/or lowering the side rails 54, 56, 58, 60 at different speeds.

Figure 4:
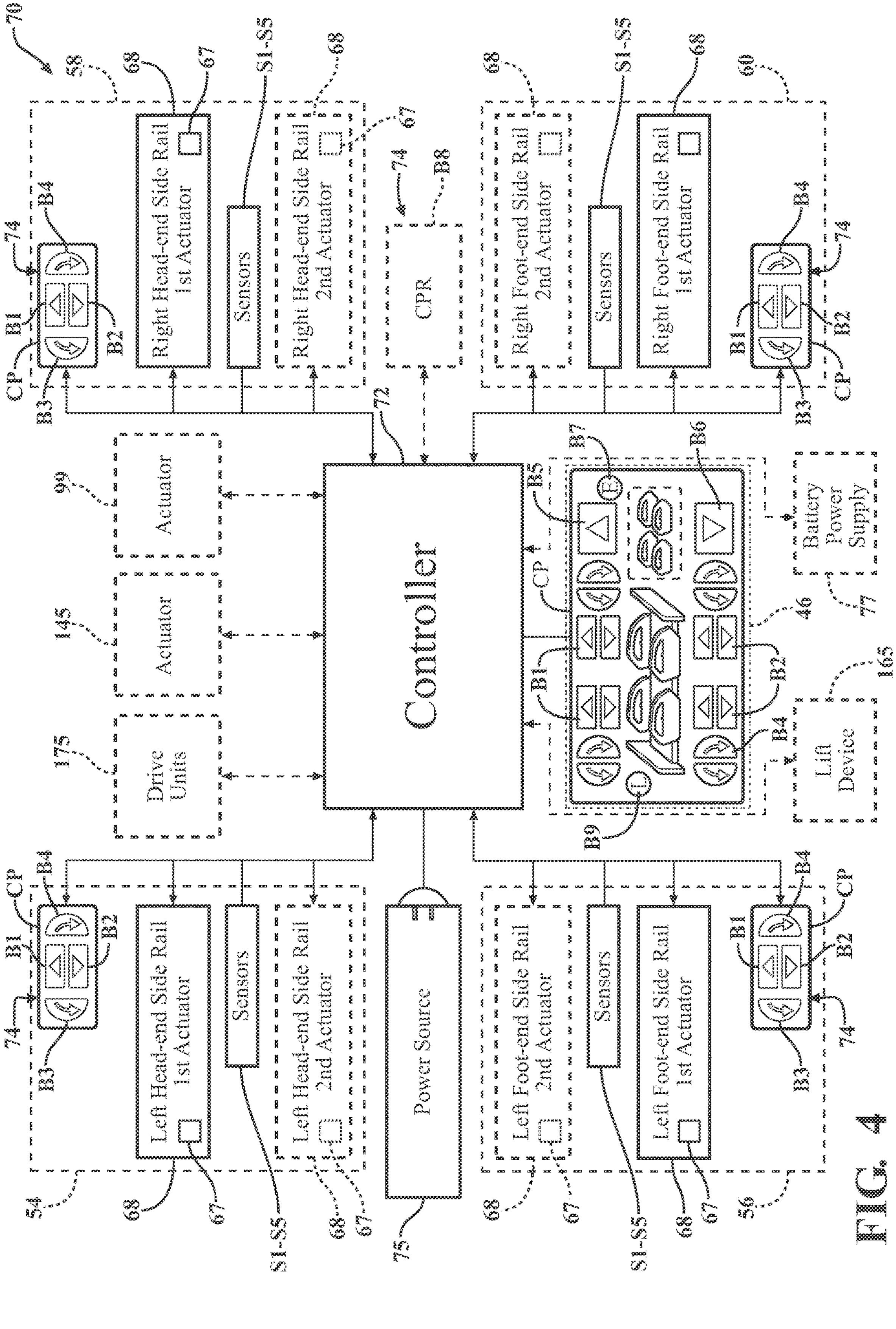
FIG. 4 is a schematic view of a control system of the patient support apparatus.

As schematically shown in FIG. 4, the patient support apparatus 30 comprises a control system 70 for controlling operation of the actuators 68 for each of the side rails 54, 56, 58, 60. The control system 70 employs a controller 72 having one or more microprocessors for processing instructions or for processing an algorithm stored in memory to control operation of the actuators 68. Additionally or alternatively, the controller 72 may comprise one or more microcontrollers, field programmable gate arrays, systems on a chip, discrete circuitry, and/or other suitable hardware, software, or firmware that is capable of carrying out the functions described herein. The controller 72 may be carried on-board the patient support apparatus 30, or may be remotely located. In one embodiment, the controller 72 is mounted to the base 34. In other embodiments, the controller 72 is mounted to the footboard 46 or any other suitable location on the patient support apparatus 30. The controller 72 may comprise one or more subcontrollers configured to control all the actuators 68 or a subset of the actuators 68, and/or other powered devices. In some cases, the controller 72 may comprise one or more subcontrollers for each of the actuators 68. Power to the actuators 68, other powered devices, and/or the controller 72 may be provided by an external power source 75 and/or a battery back-up power supply 77.

The control system 70 also comprises one or more input devices for generating an input signal to trigger operation of the actuators 68. The controller 72 is configured to receive the input signals to control the actuators 68. In one embodiment, the input devices comprise user input devices 74 located on control panels CP. The control panels CP are coupled to the footboard 46 and the side rails 54, 56, 58, 60 (see also FIG. 1). It is to be appreciated that the control panels CP could be coupled to one or more of the headboard 44, the footboard 46, the intermediate frame 36, the patient support deck 38, any combination of the side rails 54, 56, 58, 60, and/or any other suitable location.

The user input devices 74 are shown on the control panels CP in the form of push buttons that may be pressed to generate a variety of input signals, e.g., via a switch, etc. For instance, the push buttons shown comprise buttons B1 for raising the side rails 54, 56, 58, 60, buttons B2 for lowering the side rails 54, 56, 58, 60, buttons B3 for re-orienting the side rails 54, 56, 58, 60 counterclockwise, buttons B4 for re-orienting the side rails 54, 56, 58, 60 clockwise, and buttons B5, B6 for raising or lowering all the side rails 54, 56, 58, 60 simultaneously.

In other embodiments, separate buttons may be provided that correspond to a raised position, a lowered position, and/or one or more intermediate positions. Additionally, the actuators 68 may be controlled so that when raising or lowering the side rails 54, 56, 58, 60, such as in response to depressing one of the buttons B1 or B2, if the side rail 54, 56, 58, 60 reaches one or more predefined intermediate positions, operation of the associated actuator 68 is paused for a preset period of time at each predefined intermediate position before movement of the side rail 54, 56, 58, 60 continues, thereby providing the user with a visual and audible queue that the side rail 54, 56, 58, 60 is in one of the predefined intermediate positions.

In further embodiments, upon initially depressing one of the buttons B1 or B2, or initially actuating a similar user input device 74, the actuator 68 operates so that the side rail 54, 56, 58, 60 moves continuously without requiring continued actuation of the user input device 74 (e.g., without requiring continued depression of the button B1 or B2). Here, the user stops movement of the actuator 68 via a second actuation of the same user input device 74 (e.g., a second depression of the button B1 or B2) or actuation of a different user input device 74. For instance, the user may initiate movement of the side rail 54, 56, 58, 60 by depressing button B1, but then the user can stop movement via a gesture command or a voice activation command (e.g., by saying "STOP SIDE RAIL"). In some instances, this continuous movement can be paused at predefined positions, e.g., a raised position, one or more intermediate positions, and a lowered position, to give the user an opportunity to stop movement of the side rail 54, 56, 58, 60 precisely at one of the predefined positions. The movement can be paused for 1 second, 2 seconds, 3 seconds, 4 seconds, less than 5 seconds, or less than 10 seconds, at each of the predefined positions.

Aside from the buttons B5, B6, coordinated motion of the side rails 54, 56, 58, 60 could also be carried out in response to other user input devices 74. For instance, egress button B7 is a user input device 74 associated with facilitating egress of the patient from the patient support apparatus 30. Depressing egress button B7 transmits an input signal to the controller 72 that causes the controller 72 to operate the actuators 68 to move one or more of the side rails 54, 56, 58, 60 in a manner to facilitate patient egress from the patient support apparatus 30, such as raising or lowering one or more of the side rails 54, 56, 58, 60 and/or re-orienting one or more of the side rails 54, 56, 58, 60 to make patient egress easier. The same button, or a similar button, could be employed to allow ingress into the patient support apparatus 30.

CPR button B8 is a user input device 74 associated with a CPR event. CPR button B8 may be separate from the control panels CP or located on the control panels CP. Depressing button B8 transmits an input signal to the controller 72 that causes the controller 72 to operate the actuators 68 to immediately lower all of the side rails 54, 56, 58, 60 to enable caregivers to quickly administer CPR to the patient. This may include operating the actuators 68 at a rotational speed higher than normal operation. In some cases, depressing button B8 releases electromechanical devices 67 of the actuators 68, such as electromechanical clutches or brakes, which, for instance, allows the drive rotors 71 to spin freely. With the drive rotors 71 allowed to spin freely, the position of the four bar mechanism 84 is no longer constrained by the actuator 68, which results in immediate dropping of the side rails 54, 56, 58, 60 due to the force of gravity.

Lockout button B9 is a user input device 74 associated with locking out functionality of the actuators 68. When depressed, the lockout button B9 transmits an input signal to the controller 72 that causes the controller 72 to cease movement of any of the side rails 54, 56, 58, 60. During lockout, none of the user input devices 74 are capable of triggering movement of the side rails 54, 56, 58, 60. Additionally, a single depression of the lockout button B9 causes lockout and lockout remains until the lockout button B9 is depressed an additional time. This lockout feature may be triggered by depressing the lockout button B9, or the functionality of the lockout button B9 may be triggered automatically upon detecting an obstruction in the path of any one of the side rails 54, 56, 58, 60 or upon detection of any other fault or triggering condition, as described further below.

It should be appreciated that the user input devices 74 may assume forms other than the push buttons described, and may comprise touch screen buttons, sensors for receiving gesture commands, a microphone for receiving voice commands, etc. The user input devices 74 may also be located remotely, such as on remote pendants, portable electronic devices, or at nurse's stations. Additionally, in some cases, the push buttons or other user input devices 74 must be continuously actuated (e.g. depressed) to cause continuous movement of one or more of the side rails 54, 56, 58, 60. In other cases, a single actuation may be used to cause the side rails 54, 56, 58, 60 to move to an end limit of a range of desired motion (e.g., to the fully raised position or the fully lowered position). In some cases, a double press or pulse of the push buttons or other user input devices 74, within a predetermined amount of time, e.g., within 1 second, 2 seconds, 3 seconds, or 4 seconds, may cause the side rails 54, 56 58, 60 to move to the end limit of the range of desired motion. In further versions, the extent of movement of the side rail 54, 56, 58, 60 may be based on pressure of actuation or period of actuation of the user input device 74. For instance, force sensors (not shown) in communication with the controller 72 can be placed beneath the buttons B1, B2 to determine how hard the buttons B1, B2 are depressed and the controller 72 can cause a commensurate amount of movement of the side rail 54, 56, 58, 60 based on the determined force (e.g., the side rail 54, 56, 58, 60 moves further in response to relatively higher forces). Alternatively, the longer the period of time that the user input device 74 is actuated (e.g., the longer the button B1 or B2 is depressed), the further the side rail 54, 56, 58, 60 will move.

Figure 4A:
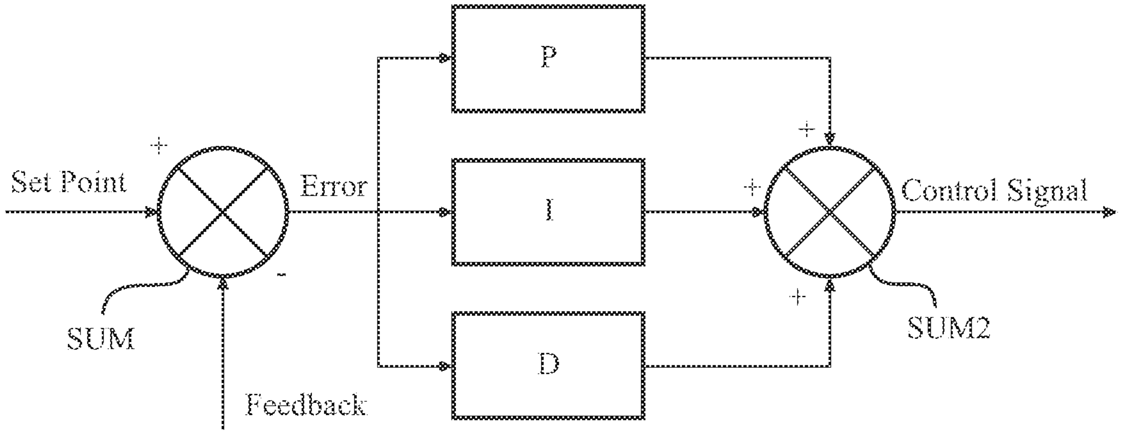
FIG. 4A is a schematic illustration of a PID control loop.

Referring to FIG. 4A, in some embodiments, such as when the actuators 68 comprise brushless DC motors, the controller 72 operates in a feedback control loop, such as a proportional (P), proportional-integral (PI), proportional-derivative (PD), or proportional-integral-derivative (PID) control loop. The (P), (I) and (D) terms are computation blocks comprising tuning parameters, which are implemented by the controller 72. The feedback control loop starts at the user input device 74 (e.g., buttons B1 or B2) providing the input signal indicative of a desired position set point or speed set point for the actuator(s) 68 or one or more of the side rails 54, 56, 58, 60. The user input device 74 is coupled to a summer SUM, which is implemented by the controller 72, into which the input signal from the input device 74 and a feedback signal of the actuator(s) 68 and/or a feedback signal associated with one or more of the side rails 54, 56, 58, 60 are also provided. These feedback signals may be utilized individually, or in combination, to provide position and/or speed feedback to the controller 72. Position feedback refers to the measured position of the actuator(s) 68 or one or more of the side rails 54, 56, 58, 60 before, after, or during raising or lowering. Speed feedback refers to the measured speed of the actuator(s) 68 or one or more of the side rails 54, 56, 58, 60 during raising or lowering. The one or more sensors, described herein, may provide such position or speed measurements. Alternatively, or additionally, other sensors, such as position sensors, speed sensors or accelerometers, may be coupled to one or more of the side rails 54, 56, 58, 60 to provide such position or speed measurements.

At the summer SUM, the desired position or speed set point is compared with the measured position or speed measurements to produce an error value indicating that the measured position or speed is not as desired. This error value is inputted to any of the (P), (I), and (D) blocks, which, if present, apply their respective tuning parameter to the error value. For example, the (P) tuning parameter corrects present (current) error by producing an output value that is proportional to the present error, the (I) tuning parameter corrects past error by producing an output value that is proportional to the magnitude and duration of the error over time, and the (D) tuning parameter predicts behavior of the actuator(s) 68 or one or more of the side rails 54, 56, 58, 60 by producing an output value that takes into account a slope of the error over time. From here, the controller 72 inputs these output values to another summer SUM2, which outputs an updated control signal for controlling the actuator(s) 68, and ultimately the one or more of the side rails 54, 56, 58, 60 to minimize the error. The feedback control loop would repeat until the measured position reaches the set point position and/or until the measured speed reaches the set point speed. It is to be appreciated that the controller 72 may implement other types of feedback control, such as any suitable linear feedback or fuzzy logic based feedback.

In some embodiments, such as when the actuators 68 comprise stepper motors, the controller 72 may have counts of motor shaft revolutions stored in its memory that correspond to various raised, lowered, and/or intermediate positions of the side rails 54, 56, 58, 60 with the stepper motors controlled to reach the desired positions or speeds by counting revolutions.

Figure 4B:
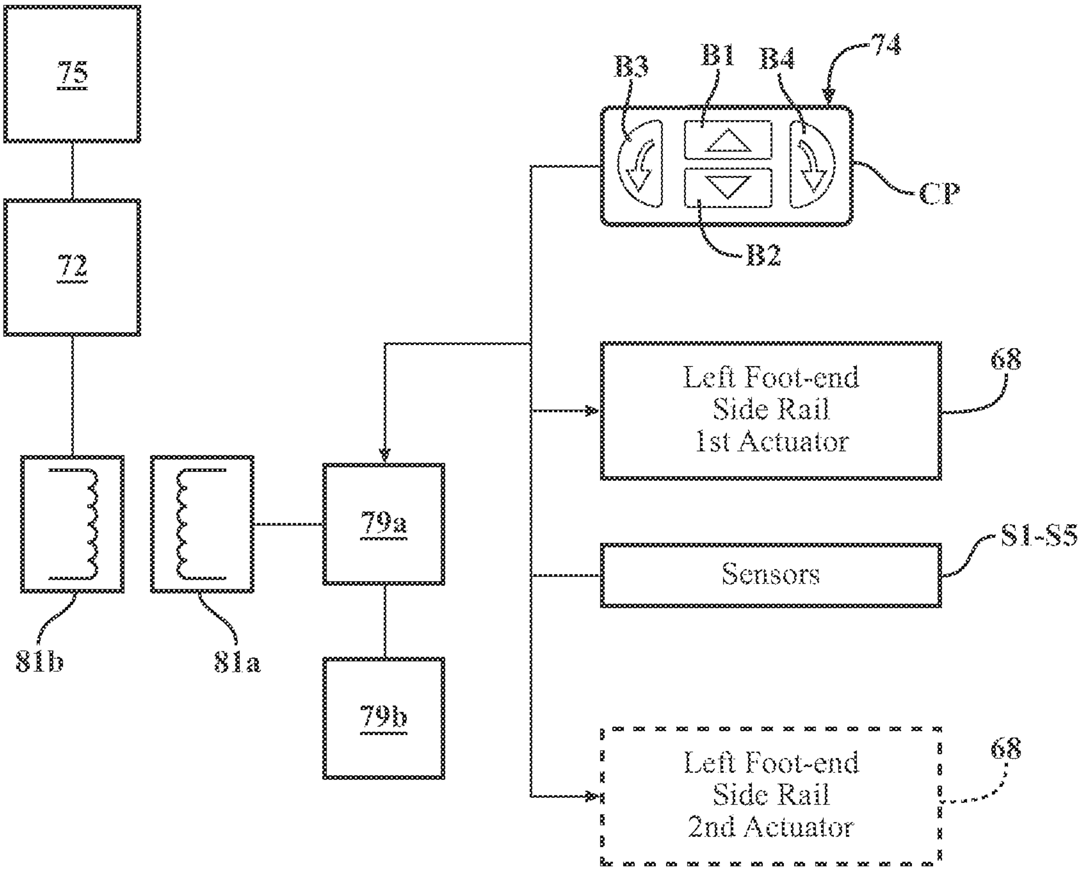
FIG. 4B is a schematic view of a control system for a modular side rail having on-board battery power.

Referring to FIG. 4B, in one embodiment, to avoid the routing of power/communication lines (e.g., via wires/cables) from the controller 72 to the actuators 68, each of the side rails 54, 56, 58, 60 comprises a separate controller 79*a* and an internal battery 79*b* (or other power storage device) to supply power to the actuators 68. As a result, the side rails 54, 56 58, 60 are modular and can be connected in any manner to the patient support apparatus 30. Said differently, the side rails 54, 56, 58, 60 are self-contained in this embodiment. Furthermore, any of the embodiments of the side rails 54, 56, 58, 60 disclosed herein can utilize self-contained side rails.

The internal batteries 79*b* are carried by the side rails 54, 56, 58, 60 and are rechargeable. For instance, the internal batteries 79*b* may be configured to be inductively charged via inductive couplings, such as via a first inductive coupling 81*a* on the side rails 54, 56, 58, 60 and second inductive couplings 81*b* on the intermediate frame 36 or other location. The inductive couplings 81*a*, 81*b* transmit power from the external power source 75 to the internal batteries 79*b* when the patient support apparatus 30 is connected to the external power source 75. In this version, command signals from the controller 72 could also be sent wirelessly to the controllers 79*a* in the event input signals are received from the user input devices 74 located on the control panel CP of the footboard 46, on portable electronic devices, or elsewhere.

Figure 5A:
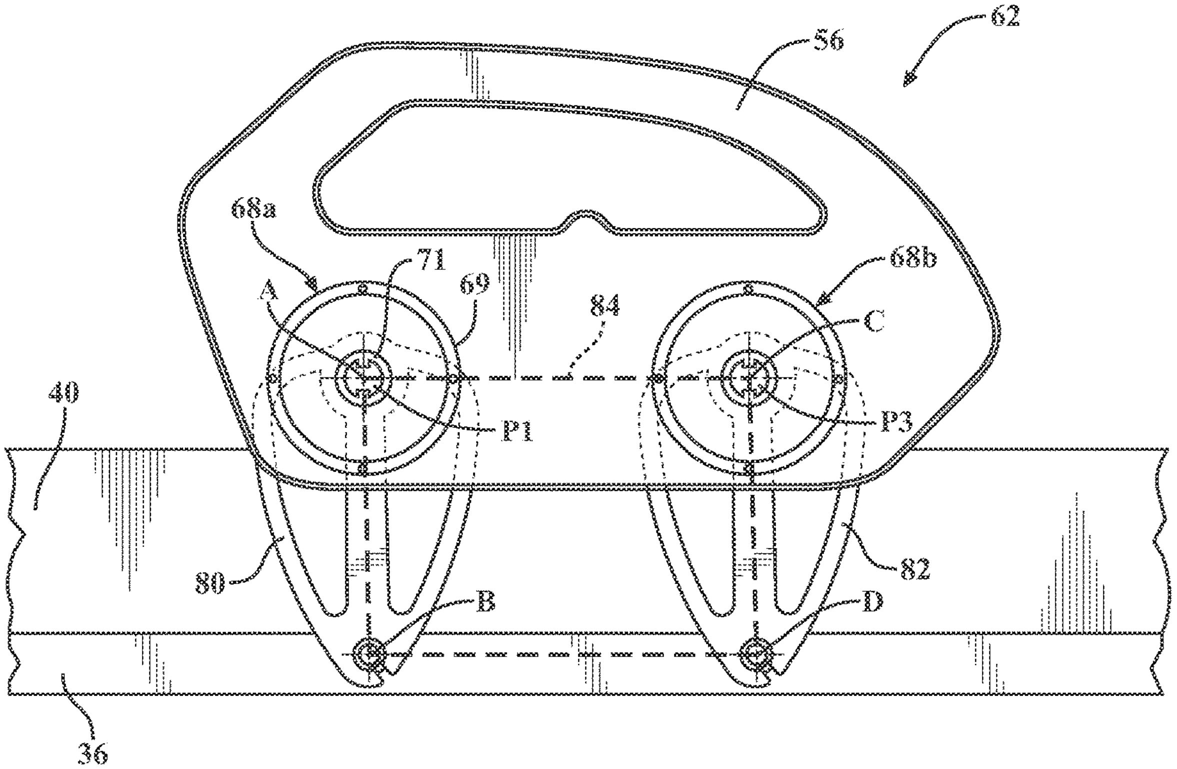
FIG. 5A is an elevational view of a side rail in a first position.
Figure 5B:
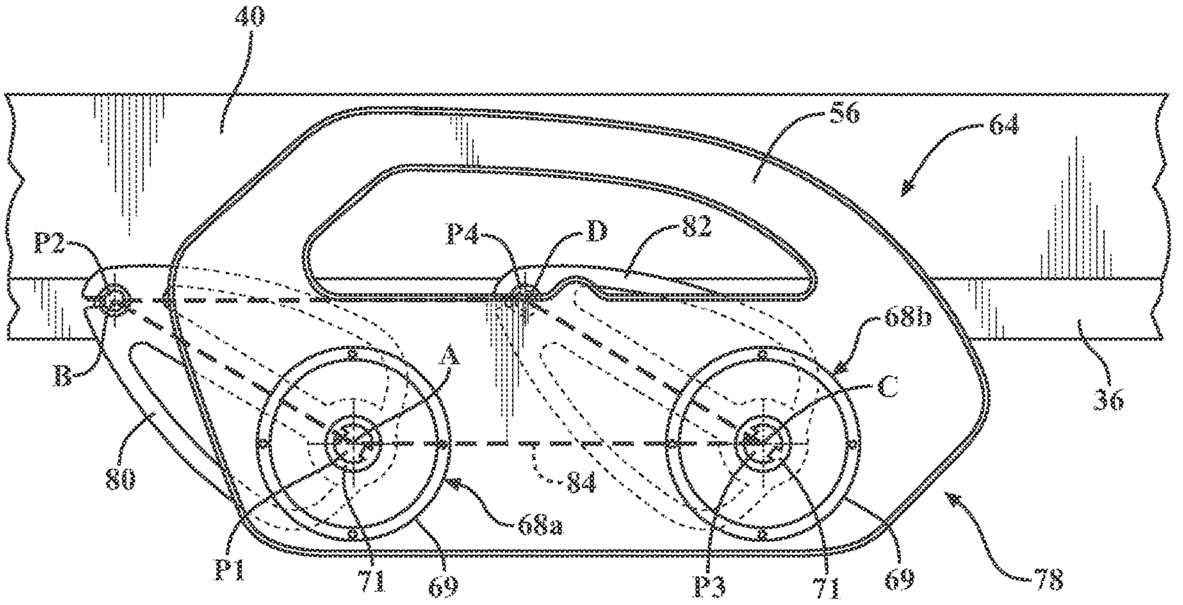
FIG. 5B is an elevational view of the side rail of FIG. 5A in a second position.

In one embodiment, as shown in FIGS. 5A and 5B, the controller 72 is configured to control first and second actuators 68*a*, 68*b* to move the side rail 56 between the first position 62 (e.g., the raised position shown in FIG. 5A) and the second position 64 (e.g., the lowered position shown in FIG. 5B). In the first position 62, the side rail 56 blocks ingress and egress into and out of the patient support apparatus 30. In the second position 64, the side rail 56 does not present as much of an obstacle to ingress and egress as the first position 62. It is to be appreciated that the side rail 56 may be configured to have any number of positions between the first position 62 and the second position 64.

In this embodiment, the actuators 68*a*, 68*b* are shown mounted to the side rail 56 and engaged to the support arms 80, 82 in the same manner as the actuator 68 shown in FIGS. 2 and 3, except that the actuators 68*a*, 68*b* now actively drive both of the support arms 80, 82. One advantage of this configuration is the ability to independently control movement of the support arms 80, 82.

As further shown in FIG. 5C, the four bar mechanism 84, denoted by dashed lines, has a toggle point 94 at which all of the pivot axes A, B, C, D align in a single, common plane. From this toggle point 94, the support arms 80, 82 may synchronously pivot in the same direction (e.g., clockwise) about their respective pivot axes A, B, C, D or the support arms 80, 82 may pivot in opposite directions about their respective pivot axes A, B, C, D. This flexibility in driving of the support arms 80, 82 is owed to the control offered by using two actuators 68*a*, 68*b* to independently drive the support arms 80, 82. As a result, the controller 72 is able to command the actuators 68*a*, 68*b* to operate in any desired manner, including in a manner that pivots the support arms 80, 82 in the same direction or different directions.

As shown in FIG. 5D, the manner in which the support arms 80, 82 pivot from the toggle point 94 (FIG. 5C) affects the orientation of the side rail 56 relative to the intermediate frame 36. When the support arms 80, 82 move synchronously in the same direction, e.g., from the position in FIG. 5A to the position in FIG. 5B, the orientation of the side rail 56 relative to the intermediate frame 36 remains constant as the side rail 56 moves. When the support arms 80, 82 pivot in opposite directions about their respective pivot axes A, B, C, D from the toggle point 94, as seen in FIG. 5D, the orientation of the side rail 56 relative to the intermediate frame 36 changes as the side rail 56 moves. Changing the orientation of the side rail 56 relative to the intermediate frame 36 may allow for the side rail 56 to only partially block ingress and/or egress into and out of the patient support apparatus 30 or to assist with ingress and/or egress.

Figure 6:
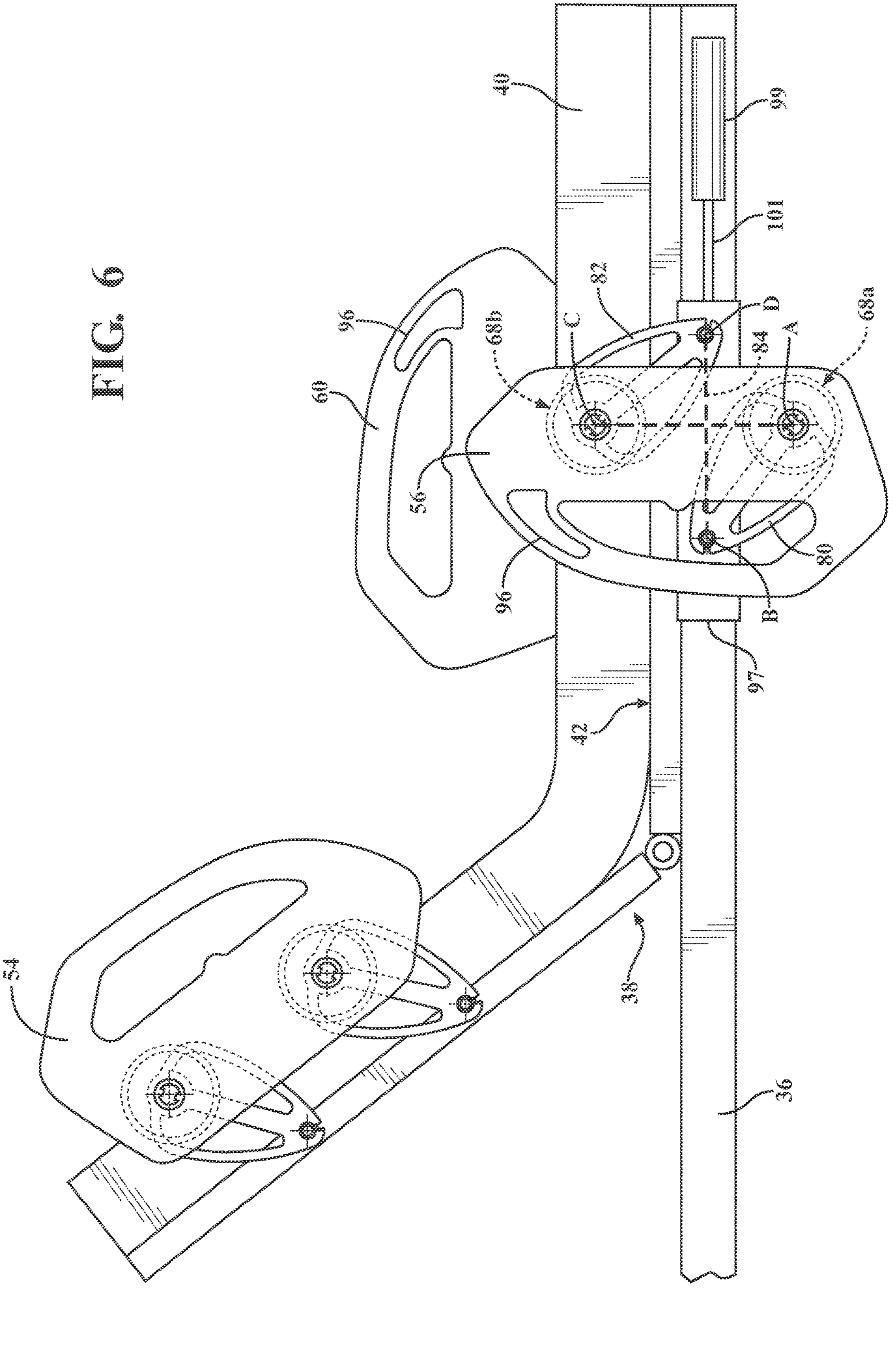
FIG. 6 is an elevational view of a side rail in a re-oriented position to provide access to an egress handle.

In one embodiment, as shown in FIG. 6, the side rail 56 comprises a patient assist handle 96 for patient ingress and egress. When the support arms 80, 82 pivot in opposite directions about their respective pivot axes A, B, C, D, the orientation of the patient assist handle 96 relative to the intermediate frame 36 changes with the orientation of the side rail 56. Changing orientation of the patient assist handle 96 relative to the intermediate frame 36 may provide the patient with a better position for grasping the patient assist handle 96 than previously offered for ingress and egress into and out of the patient support apparatus 30.

Figure 6A:
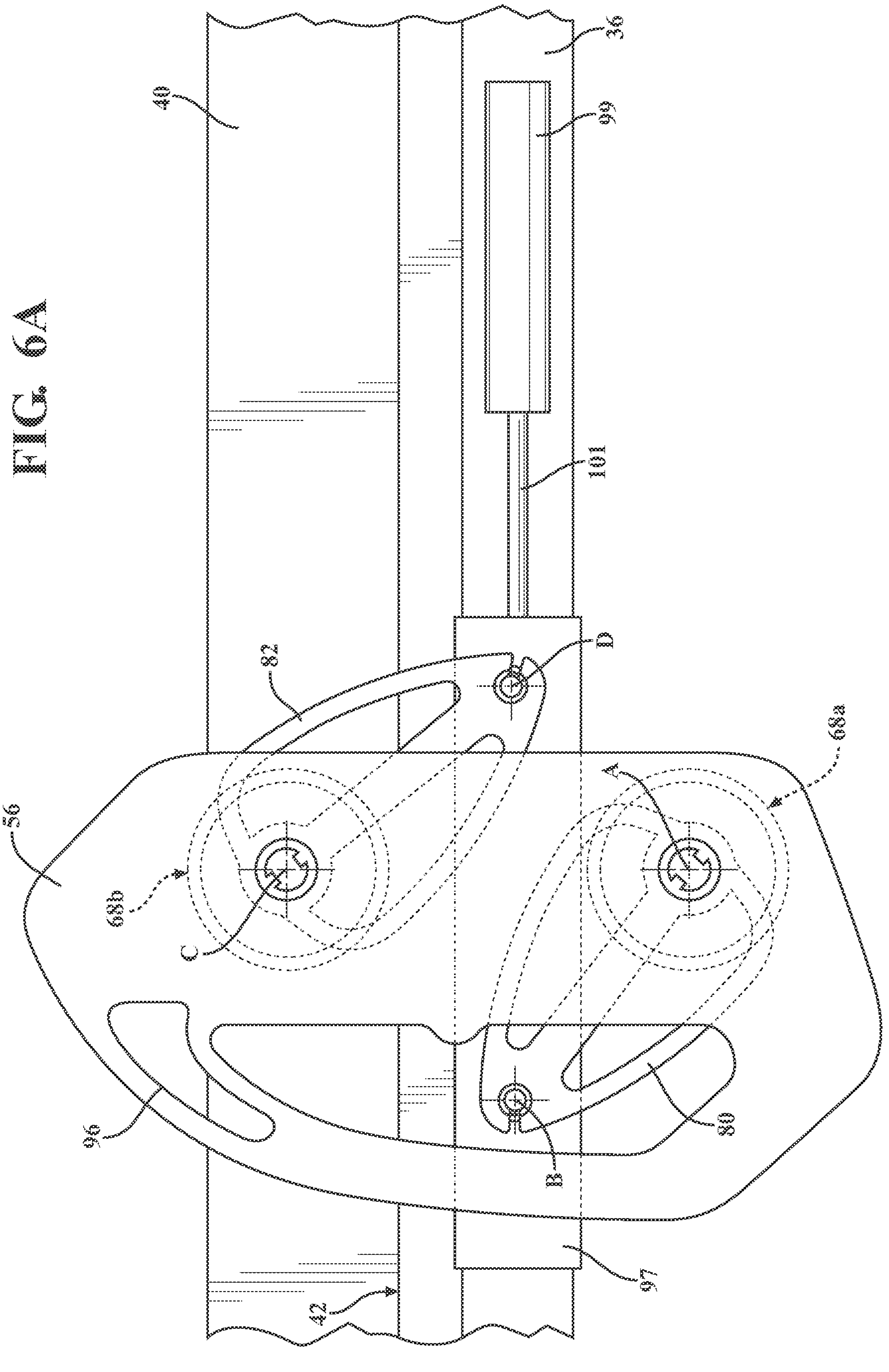
FIG. 6A is an elevational view of a portion of a side rail illustrating an actuator for translating the side rail.

Patient ingress and egress may also be further accommodated in some embodiments by additionally translating the side rail 56 relative to the intermediate frame 36. For instance, referring to FIG. 6A, a carrier 97 supports the side rail 56 on a frame member of the intermediate frame 36. The carrier 97 is capable of sliding along the frame member between positions. An actuator 99, such as a linear actuator, has a housing mounted to the frame member. The actuator 99 further comprises a drive rod 101 slidably coupled to the housing and capable of extending and retracting relative to the housing. The drive rod is connected to the carrier 97 to slide the carrier 97 in translation along the frame member. In some embodiments, when the egress button B7 is depressed, the controller 72 additionally operates the actuator 99 to further place the side rail 56 in a suitable translational position to facilitate egress.

Figure 7:
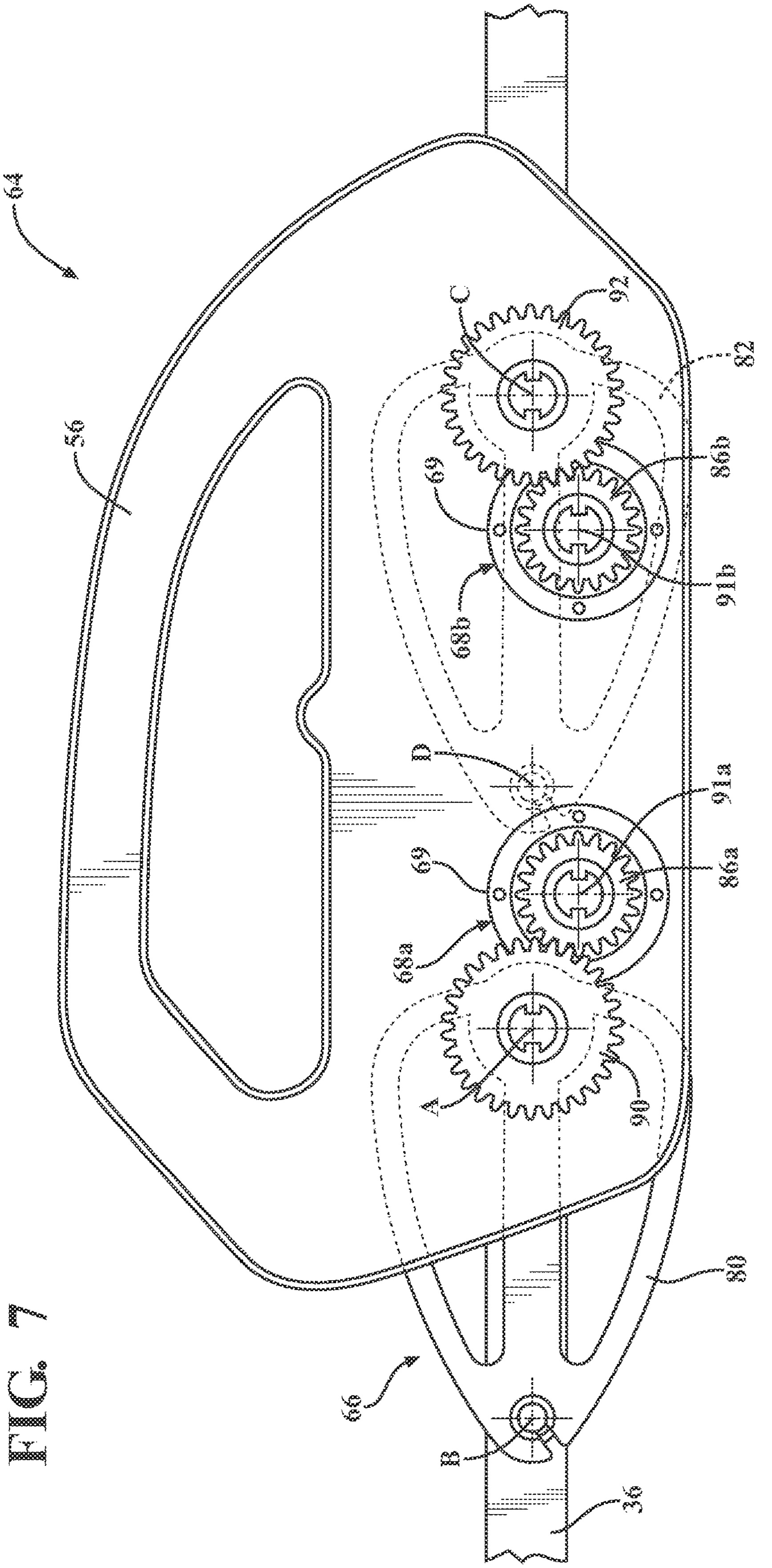
FIG. 7 is an elevational view of a side rail and support arm assembly actuated by two actuators.

As shown in FIG. 7, an alternative engagement between the actuators 68*a*, 68*b* and the support arms 80, 82 is provided. In this embodiment, the support arm assembly 66 comprises a first gear 90 that is fixed to the first support arm 80 to pivot about the first side rail pivot axis A. The first gear 90 is disposed in meshing relationship with a first actuator gear 86*a*. The first actuator gear 86*a* is driven by the first actuator 68*a*, such as via a first drive shaft 91*a*. The support arm assembly 66 also comprises a second gear 92 that is fixed to the second support arm 82 to pivot about the second side rail pivot axis C. The second gear 92 is disposed in meshing relationship with a second actuator gear 86*b*. The second actuator gear 86*b* is driven by the second actuator 68*b*, such as via a second drive shaft 91*b*. Alternatively, the first gear 90 may be located to pivot about the first frame pivot axis B and the second gear 92 may be located to pivot about the second frame pivot axis D. It is to be appreciated that the gears 90, 92 could be integrated with the support arms 80, 82. It is also to be appreciated that any combination of gears, direct engagement, or indirect engagement, may be used.

Figure 8:
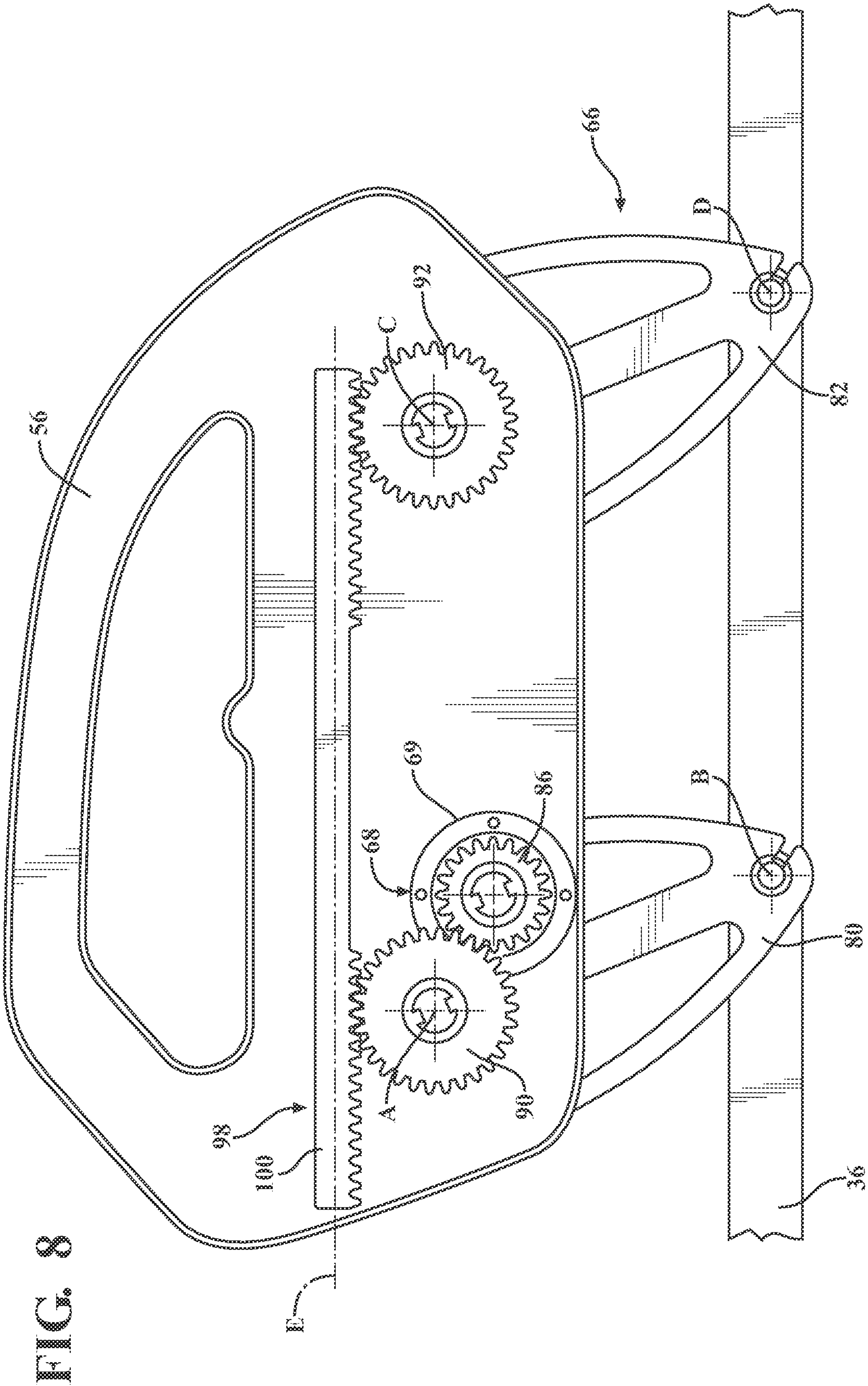
FIG. 8 is an elevational view illustrating a timing link for a support arm assembly actuated by an actuator coupled to the support arm assembly by an actuator gear.
Figure 9:
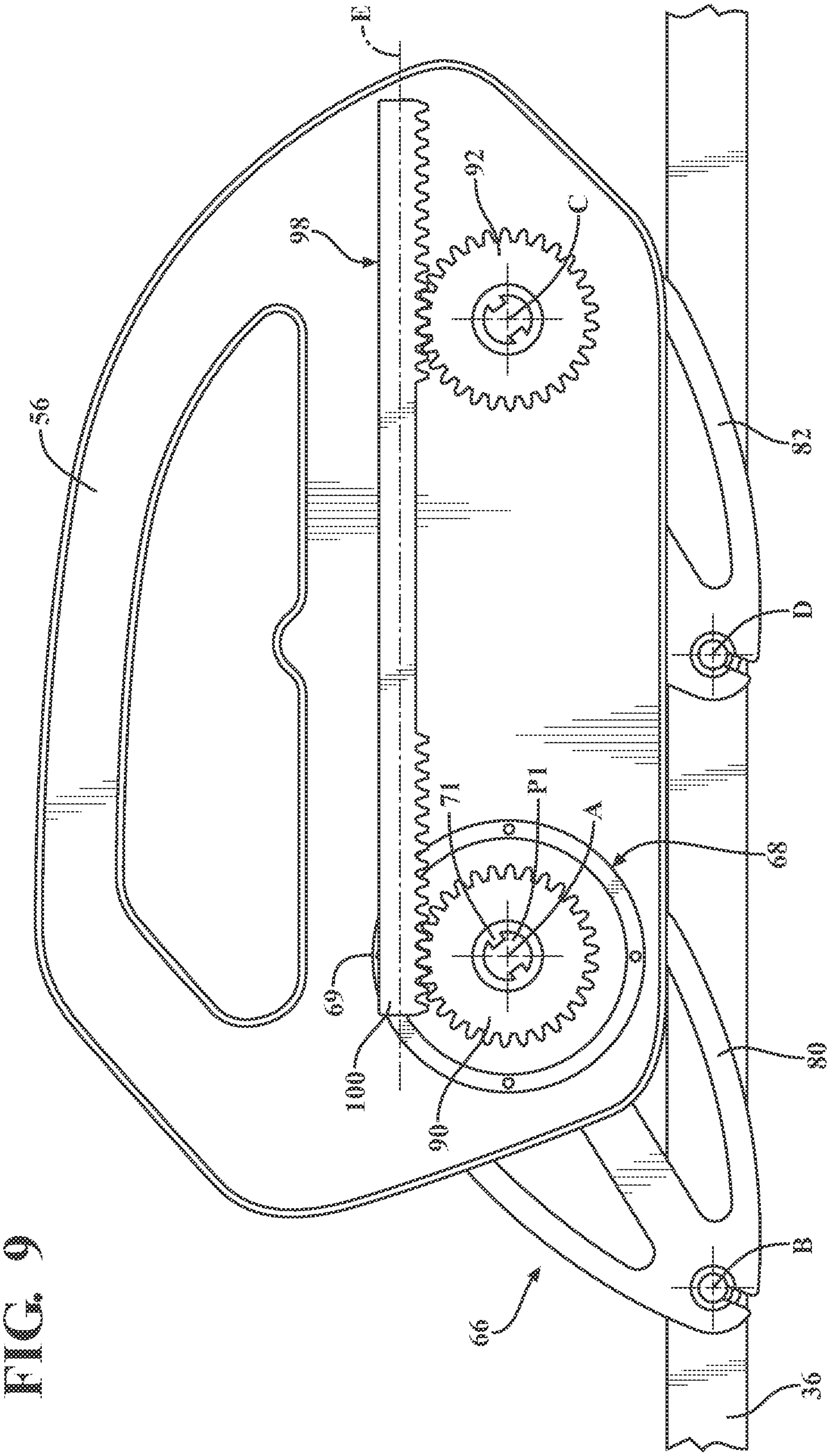
FIG. 9 is an elevational view illustrating the timing link for the support arm assembly actuated by an actuator coupled to the support arm assembly with a direct drive connection.
Figure 10:
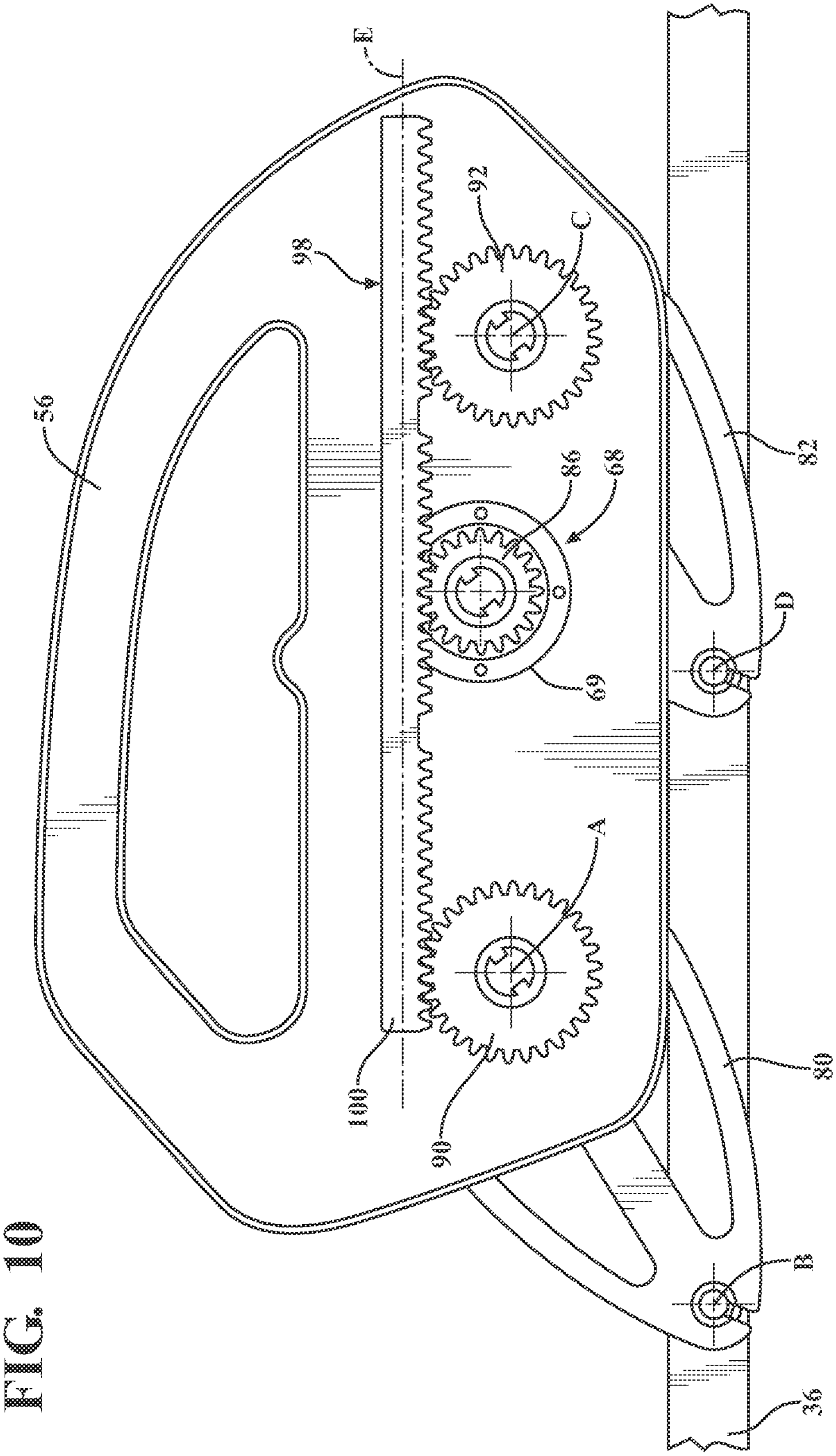
FIG. 10 is an elevational view illustrating an alternative timing link for the support arm assembly actuated by an actuator engaging the timing link.

In some embodiments, referring to FIGS. 8-10, as an alternative to using two actuators 68*a*, 68*b*, a timing mechanism 98 is used in combination with a single actuator 68 to constrain the support arms 80, 82 so that they pivot synchronously about their respective pivot axes A, B, C, D, in the same direction, through the toggle point 94, to maintain a constant orientation of the side rail 56 relative to the intermediate frame 36 as the side rail 56 moves between positions. A separate timing mechanism is absent in FIGS. 5-7, but a similar function is provided through the use of two actuators 68*a*, 68*b*, which enables synchronous pivoting of the support arms 80, 82 through the toggle point 94. Various timing mechanisms 98 are further discussed below.

In the embodiments of the timing mechanism 98 shown in FIGS. 8-10, the timing mechanism 98 comprises a timing link 100 movably coupled to the side rail 56 and disposed in a meshing relationship with the support arm assembly 66. Similar to the prior embodiment shown in FIG. 7, the first gear 90 is fixed to the first support arm 80 to pivot about the first side rail pivot axis A and the second gear 92 is fixed to the second support arm 82 to pivot about the second side rail pivot axis C. Alternatively, the first gear 90 may be fixed to the first support arm 80 to pivot about the first frame pivot axis B and the second gear 92 may be fixed to the second support arm 82 to pivot about the second frame pivot axis D. It is to be appreciated that the gears 90, 92 could be integrated with the support arms 80, 82.

The timing link 100 has opposing end sections with teeth designed to mesh with teeth on the gears 90, 92. The timing link 100 is constrained so that the timing link 100 remains in meshing contact with the gears 90, 92 during the entire motion of the side rail 56. More specifically, the timing link 100 is constrained to slide along an axis E parallel to the side rail 56. The timing link 100 is driven along the axis E in response to pivoting of the gears 90, 92 during operation of the actuator 68. The timing link 100 engages the gears 90, 92 to constrain the support arms 80, 82 to pivot in the same direction about their respective pivot axes A, B, C, D through the toggle point 94.

In the embodiments of FIGS. 8-10, several different arrangements of the actuator 68 are possible to raise and lower the side rail 56, including through the toggle point 94. In FIG. 8, the actuator gear 86, which is driven by the actuator 68, engages the gear 90 to pivot the gear 90 about the side rail pivot axis A. The actuator gear 86 could alternatively engage the gear 92 in other embodiments. In FIG. 9, the actuator 68 directly engages the pivot member P1, in the same manner as shown in FIG. 2, to provide a direct drive connection to the first support arm 80 to raise and lower the side rail 56. The actuator 68 could alternatively provide a direct drive connection to the second support arm 82 in other embodiments. In FIG. 10, the actuator gear 86 is arranged to mesh with the timing link 100 to slide the timing link 100 in either direction to raise and lower the side rail 56. Other arrangements of the gears 90, 92, timing link 100, and actuator 68 are also possible. For instance the gears 90, 92 could be located to pivot about the frame pivot axes B, D with the timing link 100 slidably coupled to the intermediate frame 36 to mesh with the gears 90, 92.

Figure 11:
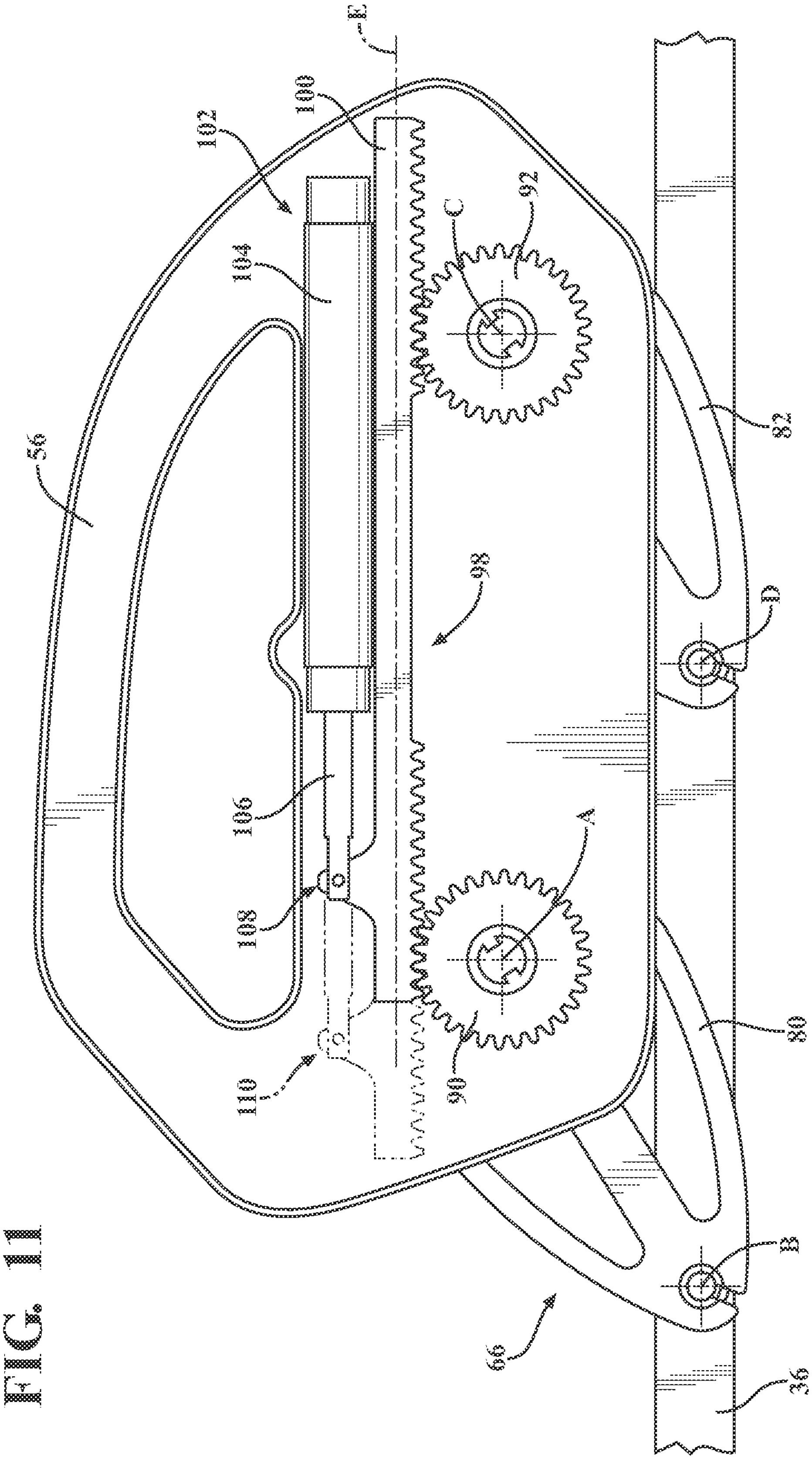
FIG. 11 is an elevational view illustrating a linear actuator for actuating the support arm assembly.

Referring to FIG. 11, in another embodiment, a linear actuator 102 is shown that comprises a housing 104 and a drive rod 106 extending from the housing 104. The drive rod 106 moves between a first drive rod position 108 and a second drive rod position 110. The housing 104 is fixed to the side rail 56 and the drive rod 106 is coupled to the timing link 100 to slide the timing link 100. As the drive rod 106 moves between the first drive rod position 108 and the second drive rod position 110, the timing link 100 engages with the first gear 90 and the second gear 92 fixed to the support arms 80, 82 to pivot the support arms 80, 82 in the same direction about their respective pivot axes A, B, C, D, and through the toggle point 94. The timing link 100 is constrained to move along the axis E parallel to the side rail 56. In other embodiments, the gears 90, 92 are located to pivot about the frame pivot axes B, D and the timing link 100 is constrained to slide along the intermediate frame 36.

Figure 12:
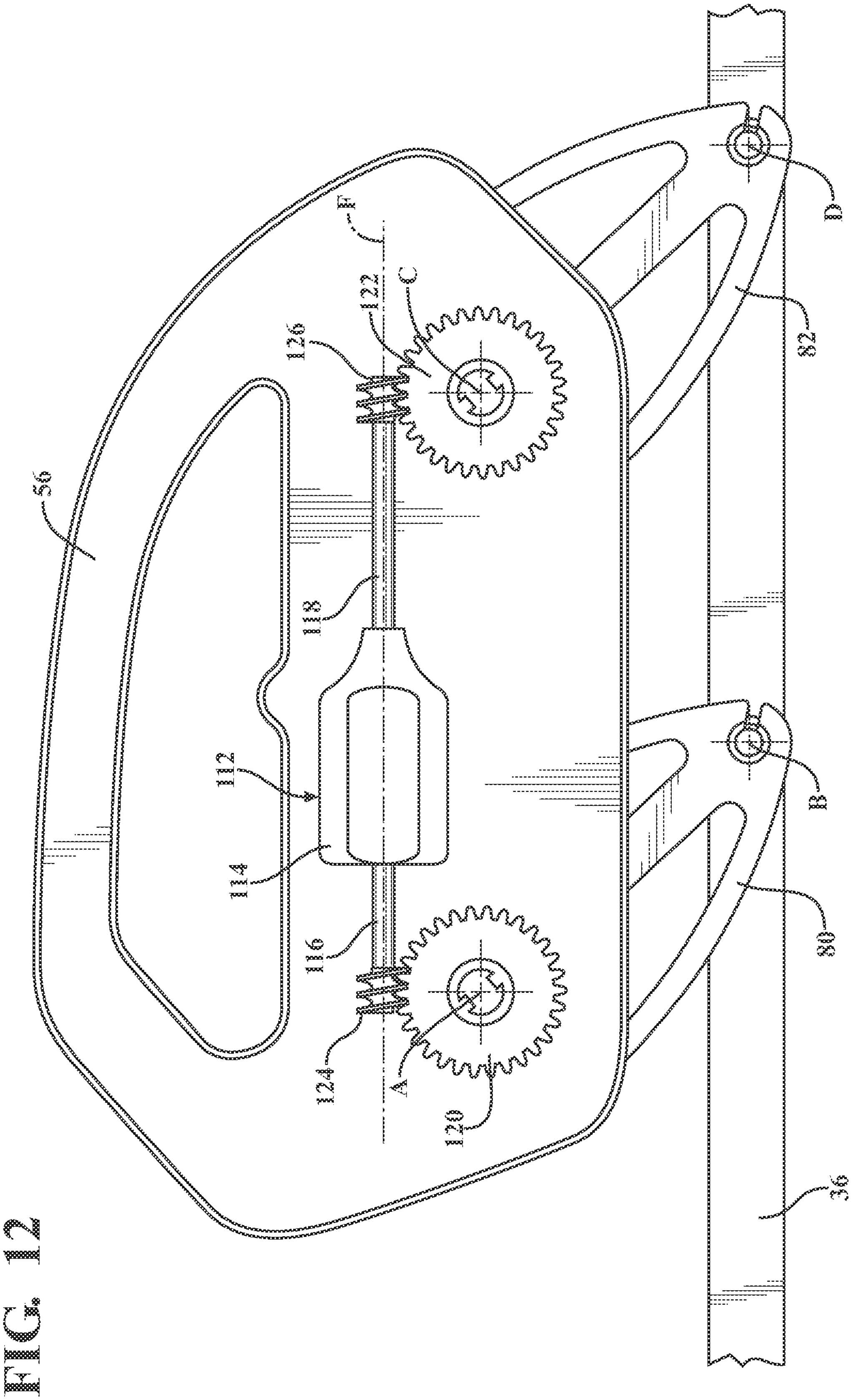
FIG. 12 is an elevational view illustrating a worm drive for actuating an alternative support arm assembly.

Referring to FIG. 12, in another embodiment, a worm drive actuator 112 is provided. The worm drive actuator 112 operates to raise and lower the side rail 56, while also providing the same function as the timing link 100. The worm drive actuator 112 comprises a housing 114, a first worm shaft 116 extending from the housing 114, and a second worm shaft 118 extending from the housing 114 in a direction opposite the first worm shaft 116. The worm shafts 116, 118 rotate concurrently about an axis F passing centrally through the housing 114. The housing 114 is fixed to the side rail 56. In this embodiment, first and second worm gears 120, 122 are fixed to the support arms 80, 82 in the same manner as the gears 90, 92 of other embodiments. The first worm shaft 116 comprises a first worm 124 engageable with the first worm gear 120. The second worm shaft 118 comprises a second worm 126 engageable with the second worm gear 122. As the worm shafts 116, 118 rotate about the axis F, the worms 124, 126 mesh with the worm gears 120, 122 to synchronously pivot the support arms 80, 82, in the same direction, about their respective pivot axes A, B, C, D, and through the toggle point 94. In other embodiments, the worm gears 120, 122 are located to pivot about the frame pivot axes B, D and the worm drive actuator 112 is mounted to the intermediate frame 36.

Figure 13:
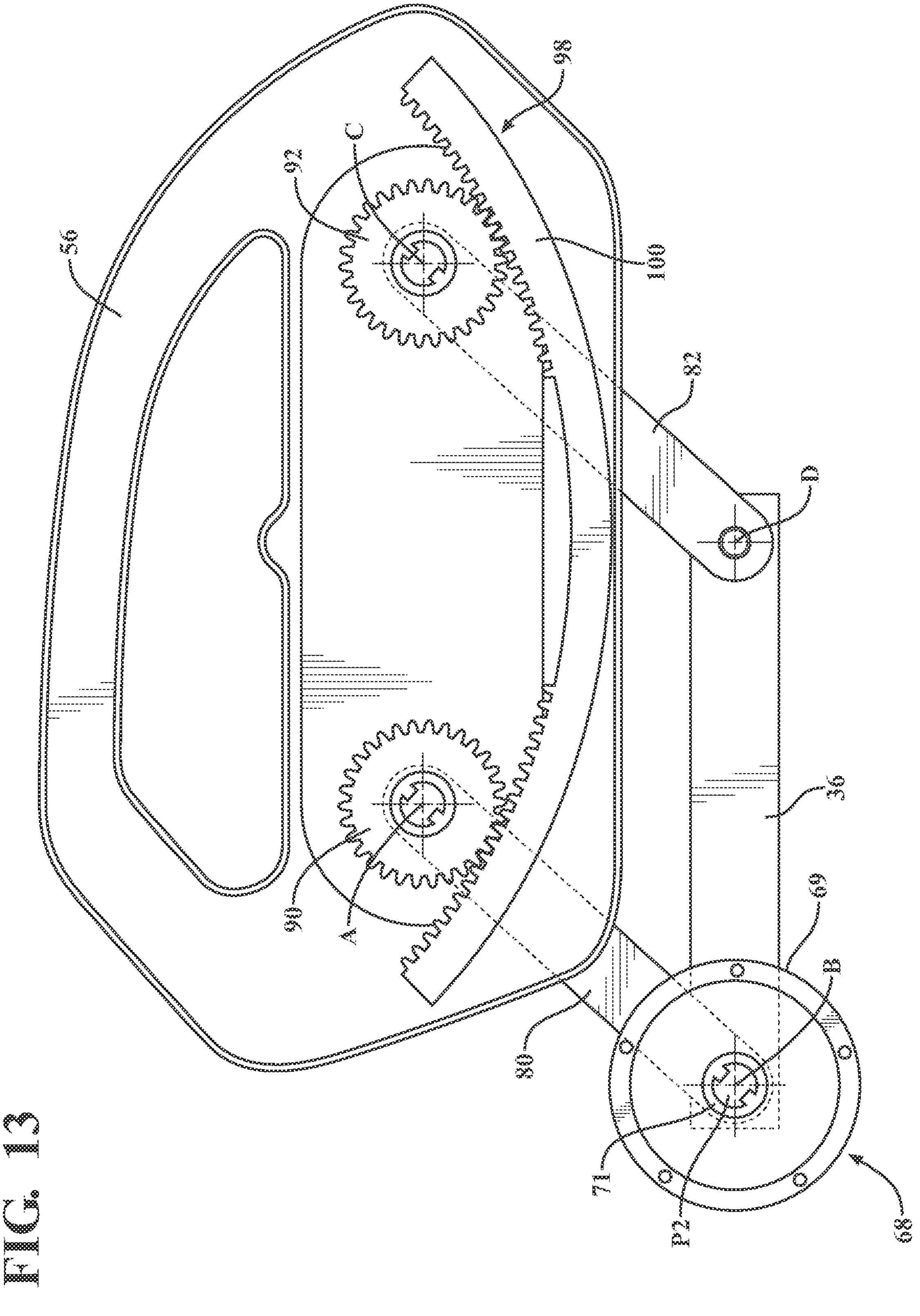
FIG. 13 is an elevational view illustrating an alternative timing link having an arcuate shape.

Referring to FIG. 13, in another embodiment, the timing link 100 has a non-linear shape. With a non-linear shape, the timing link 100 allows for alternative packaging of components associated with the side rail 56. In this embodiment, the actuator 68 is shown in a direction drive connection with the first support arm 80 via the first frame pivot member P2, which is fixed to the first support arm 80. The housing 69 of the actuator 68 is fixed to the intermediate frame 36 and the rotor 71 drives the first frame pivot member P2 in the same manner as the rotor 71 drives the first side rail pivot member P1 in FIGS. 2 and 3.

Figure 14:
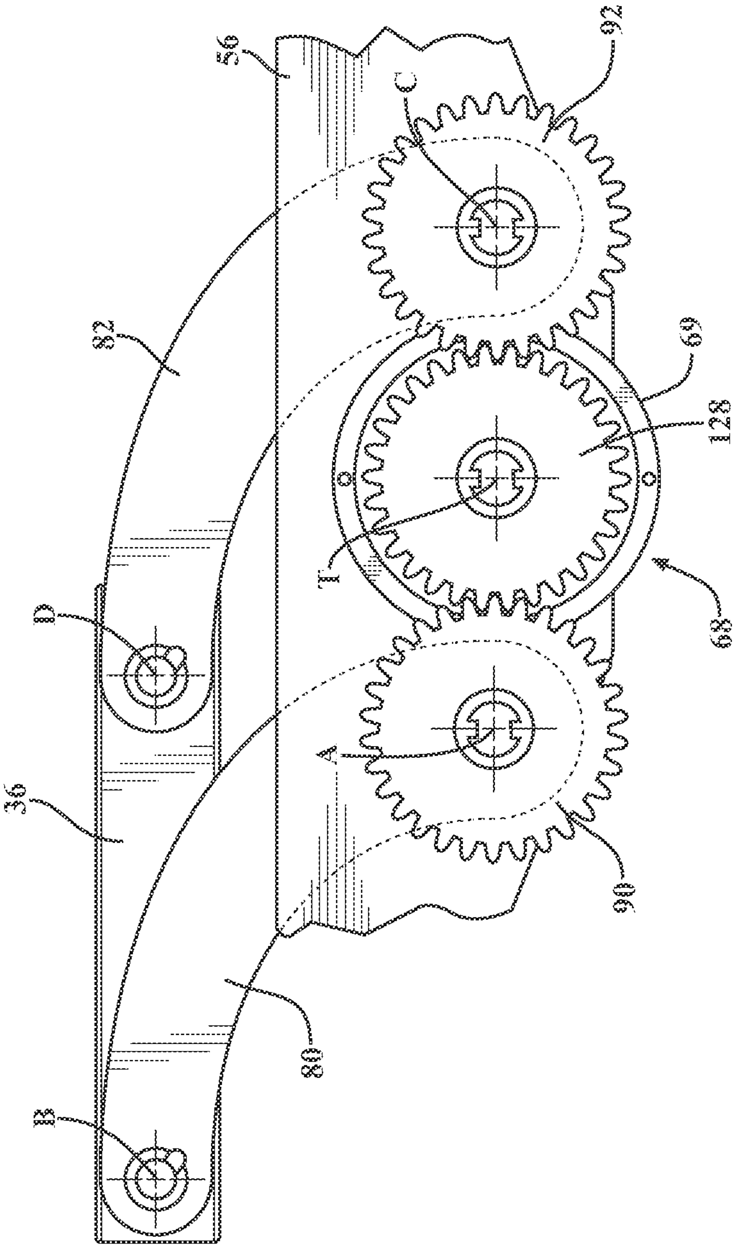
FIG. 14 is an elevational view illustrating a rotary timing link.

Referring to FIG. 14, in another embodiment, the timing link 100 comprises a gear train having at least one timing gear 128. The timing gear 128 is rotatably coupled to the side rail 56 about a timing pivot axis T and engages with both of the gears 90, 92 to synchronously pivot the support arms 80, 82 in the same direction about their respective pivot axes A, B, C, D and through the toggle point 94. Alternatively, the gears 90, 92 may be located to pivot about the frame pivot axes B, D and the timing gear 128 may be coupled to the intermediate frame 36. In this embodiment, the actuator 68 is shown in a direct drive connection with the timing gear 128 to rotate the timing gear 128 and the gears 90, 92 via a meshing relationship with the timing gear 128.

Figure 15A:
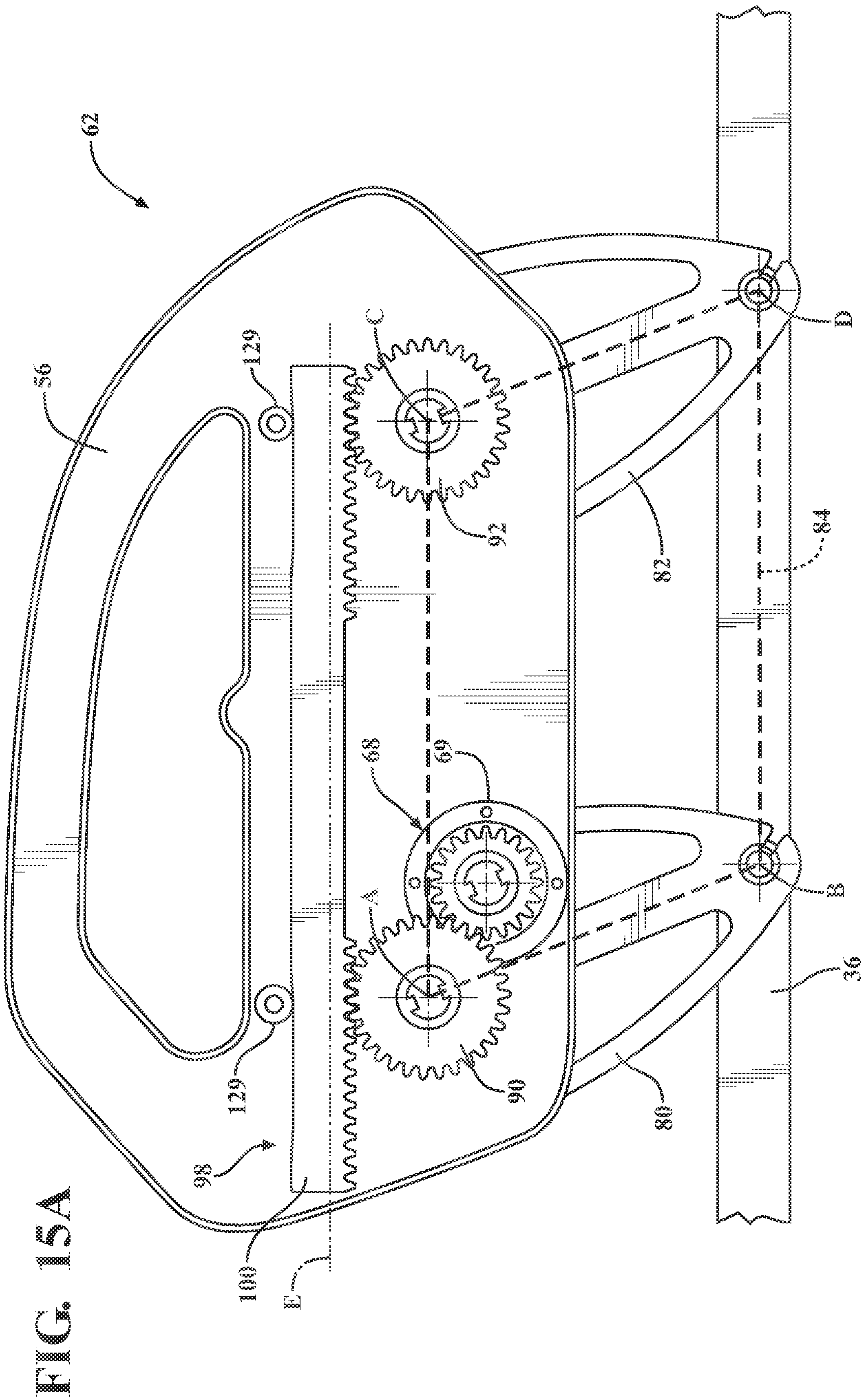
FIG. 15A is an elevational view illustrating an alternative timing link of varying height with a side rail in a first position.
Figure 15B:
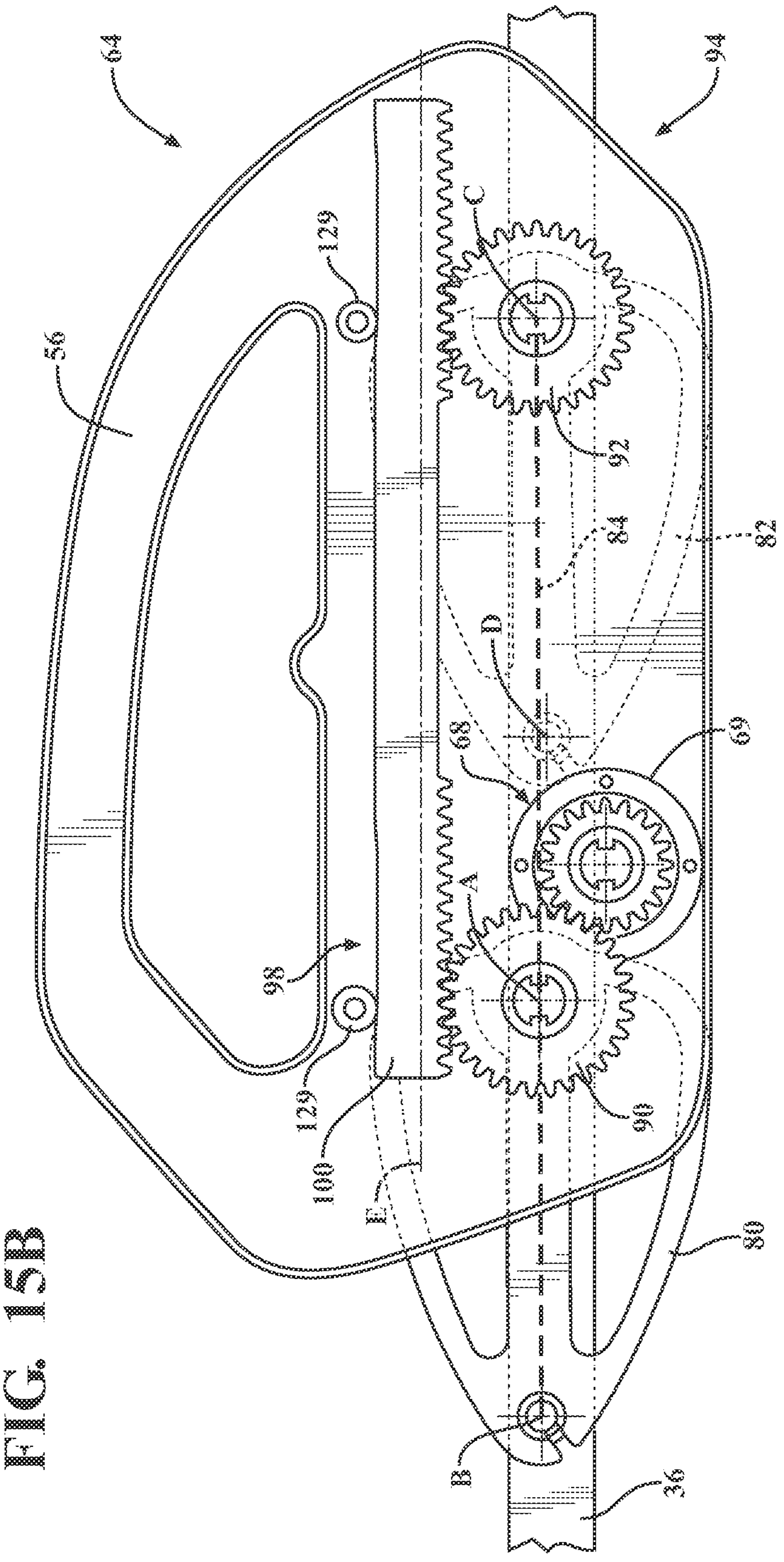
FIG. 15B is an elevational view illustrating the alternative timing link of FIG. 15A with the side rail in a second position.

Referring to FIGS. 15A and 15B, in another embodiment, the side rail 56 comprises rollers 129 rotatably coupled to the side rail 56 to keep constant engagement between the timing link 100 and the gears 90, 92. A height of the timing link 100 between the rollers 129 and the gears 90, 92 changes as the side rail 56 moves between the first position 62 and the second position 64. In the first position 62, the height of the timing link 100 between the rollers 129 and the gears 90, 92 is narrower than in the second position 64. As the side rail 56 moves from the first position 62 (FIG. 15A) to the second position 64 (FIG. 15B), the engagement between the timing link 100 and the gears 90, 92 becomes tighter owing to the fixed distance between the rollers 129 and the gears 90, 92. The tight engagement significantly reduces play developed from assembly or manufacturing, between the timing link 100 and the gears 90, 92 as the side rail 56 approaches the toggle point 94. Play in the four bar mechanism 84 as the side rail 56 approaches the toggle point 94 may cause the four bar mechanism 84 to bind and not function properly. Tight engagement between the timing link 100 and the gears 90, 92 mitigates the potential for excess play to bind the four bar mechanism 84.

Figure 16:
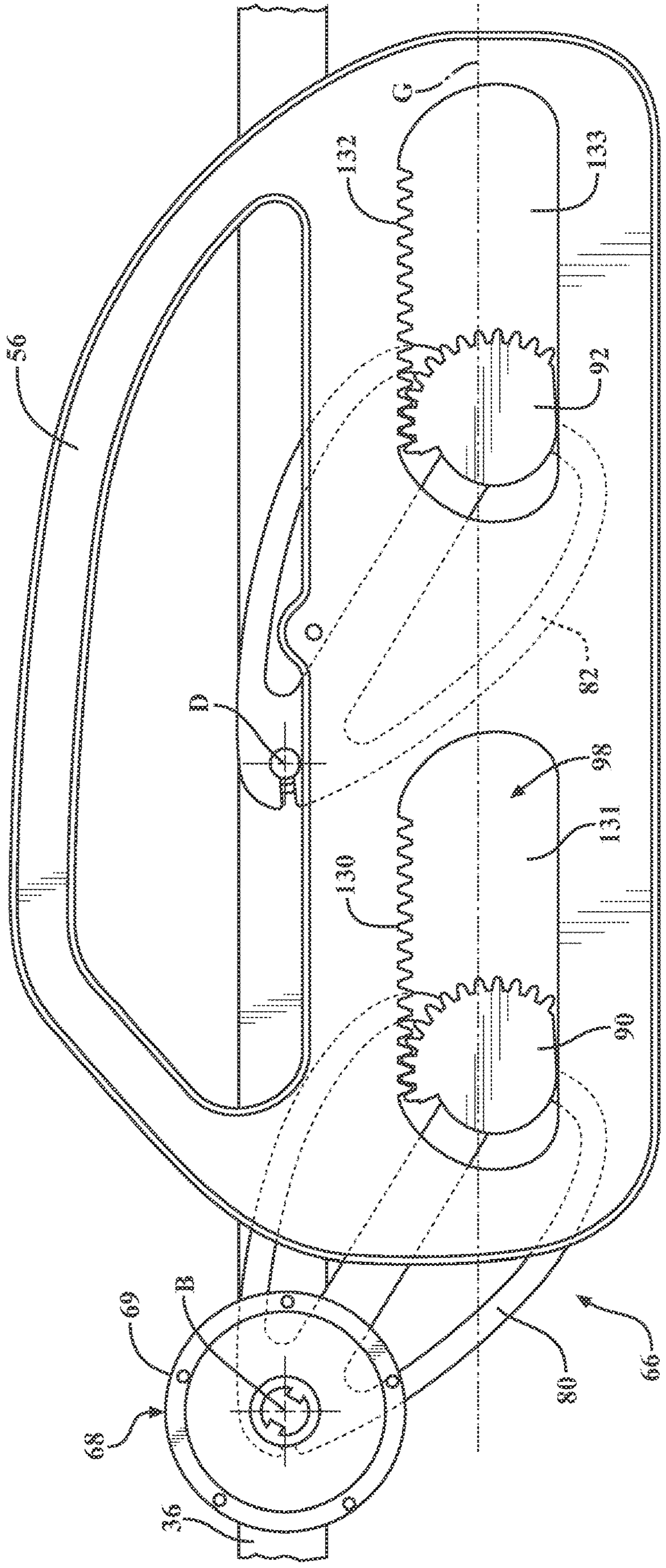
FIG. 16 is an elevational view illustrating a side rail with an integral timing link.

Referring to FIG. 16, in another embodiment, the timing mechanism 98 is integrated into the side rail 56 and disposed in a meshing relationship with the support arm assembly 66. The side rail 56 comprises a first rack 130 disposed in a meshing relationship with the first gear 90 and a second rack 132 disposed in a meshing relationship with the second gear 92. The racks 130, 132 are fixed to the side rail 56. In some cases, the racks 130, 132 are fixed to the side rail 56 by being integrally molded with the side rail 56. In this embodiment, the gears 90, 92 do not pivot about side rail pivot axes A, C. Instead, the side rail 56 is constrained to move along an axis G relative to the gears 90, 92 similar to a rack and pinion system. More specifically, the side rail 56 defines elongated openings 131, 133 in which the gears 90, 92 support the side rail 56 and in which the gears 90, 92 ride along the racks 130, 132.

The racks 130, 132 engage with the gears 90, 92 to synchronously pivot the support arms 80, 82 in the same direction about their respective frame pivot axes B, D, and through the toggle point 94. The engagement between the racks 130, 132 and the gears 90, 92 is similar to the embodiments having the timing link 100. However, rather than the timing link 100 moving relative to the side rail 56, the side rail 56 moves relative to the gears 90, 92. The orientation of the side rail 56 relative to the intermediate frame 36 is held constant, so that the side rail 56 moves parallel to the intermediate frame 36 as the side rail 56 moves between positions. One advantage of this embodiment is the increase in overall range of motion of the side rail 56 relative to the intermediate frame 36.

In another embodiment, the gears 90, 92 are pivotally connected to the support arms 80, 82 to pivot relative to the support arms 80, 82, but are capable of being locked to prevent pivoting of the gears 90, 92 relative to the support arms 80, 82. Locking pins (not shown) or other suitable locking devices can be employed to releasably lock the gears 90, 92 to the support arms 80, 82. In this embodiment, the gears 90, 92 can be locked from pivoting relative to the support arms 80, 82 when raising or lowering the side rail 56 in the manner previously described. Once the side rail 56 is in a desired position, the user can unlock the gears 90, 92 to allow them to pivot relative to the support arms 80, 82. As a result, the user can manually translate the side rail 56 since the racks 130, 132 are no longer constrained by the gears 90, 92, owing to the now freely pivoting nature of the gears 90, 92.

Figure 17:
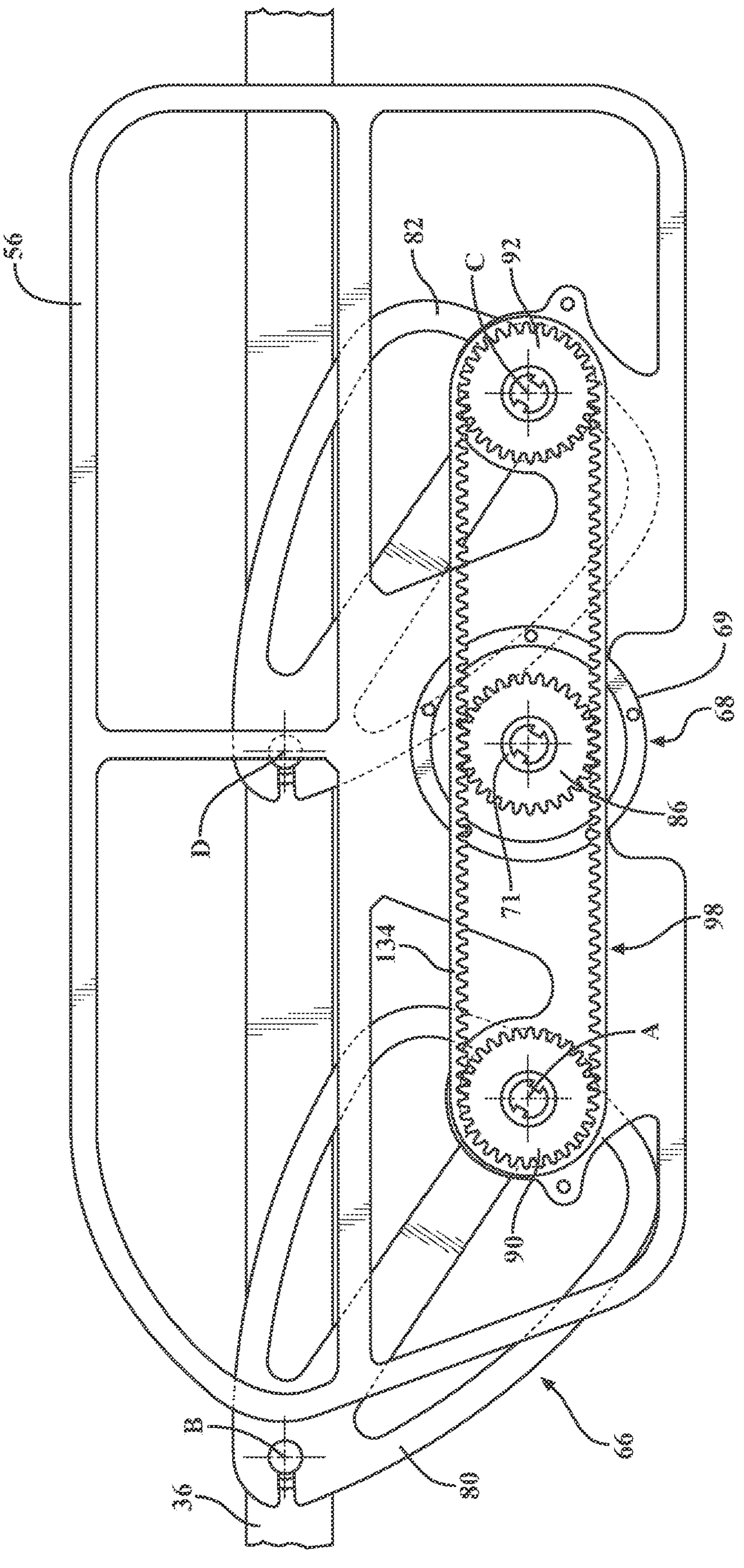
FIG. 17 is an elevational view illustrating a timing mechanism comprising a timing chain.

In another embodiment, as shown in FIG. 17, the timing mechanism 98 comprises a chain 134. The chain 134 extends around the gears 90, 92 to constrain the support arms 80, 82 to pivot in the same direction about their respective pivot axes A, B, C, D, and through the toggle point 94. Alternatively, the chain 134 could be a belt extending around the gears 90, 92. As in previous embodiments, the first gear 90 is fixed to the first support arm 80 to pivot about the first side rail pivot axis A and the second gear 92 is fixed to the second support arm 82 to pivot about the second side rail pivot axis C. Also as in previous embodiments, the actuator 68 may directly or indirectly engage one of the support arms 80, 82. Alternatively, the actuator 68 may engage the chain 134 directly or indirectly to drive the chain 134 and the support arms 80, 82 to pivot about their respective pivot axes A, B, C, D, and through the toggle point 94. In the version shown, the housing 69 of the actuator 68 is fixed to the side rail 56 and the rotor 71 is driving the actuator gear 86 to drive the chain 134.

Figure 18A:
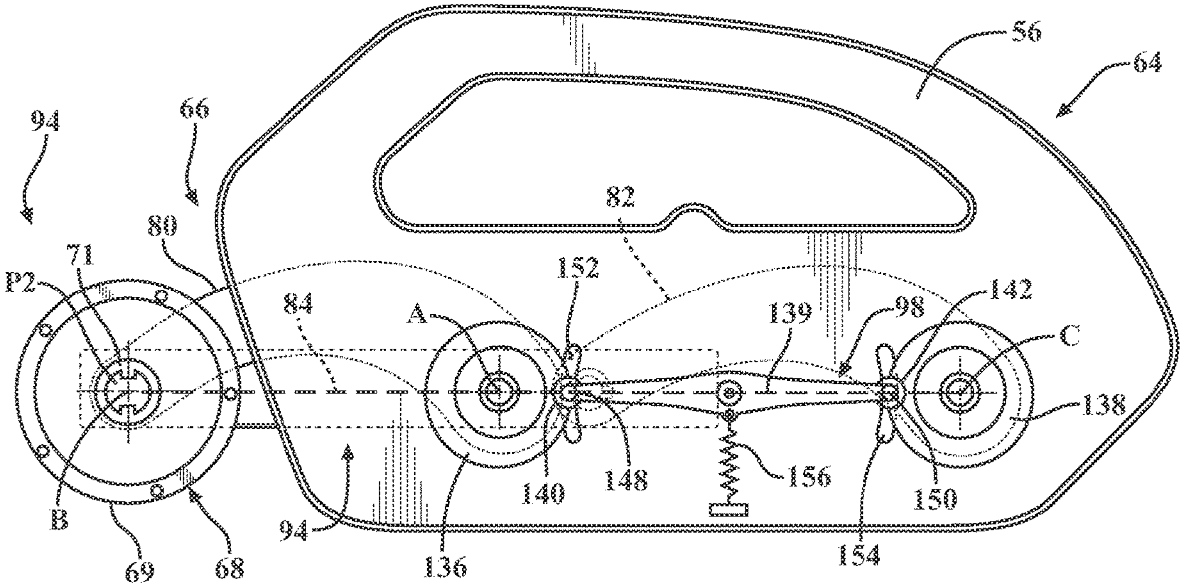
FIG. 18A is an elevational view illustrating a timing mechanism comprising a pivoting timing link engaging timing elements.
Figure 18B:
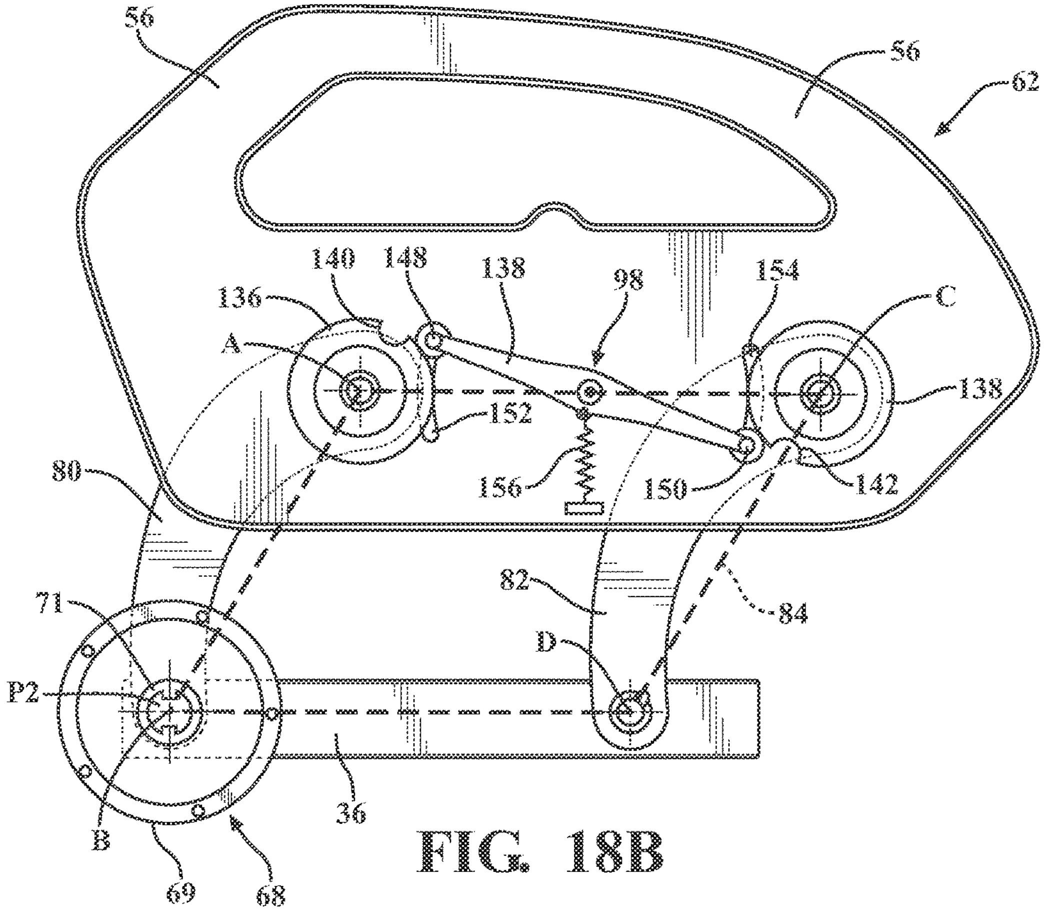
FIG. 18B is an elevational view illustrating the timing link of FIG. 18A disengaged from the timing elements.

In another embodiment, as shown in FIGS. 18A and 18B, the timing mechanism 98 comprises a first timing element

136 and a second timing element 138. The first timing element 136 defines a first recess 140. The second timing element 138 defines a second recess 142. The first timing element 136 is fixed to the first support arm 80 to pivot about the first side rail pivot axis A. The first recess 140 is configured to pivot about the first side rail pivot axis A in conjunction with the first timing element 136. The second timing element 138 is fixed to the second support arm 82 to pivot about the second side rail pivot axis C. The second recess 142 is configured to pivot about the second side rail pivot axis C in conjunction with the second timing element 138. In this embodiment, the actuator 68 is shown engaging the first support arm 80 in a direct drive connection via the first frame pivot member P2 at the first frame pivot axis B.

The timing mechanism 98 further comprises a timing link 139 pivotally coupled to the side rail 56 about a timing link pivot axis. The timing link 139 comprises an elongate body defining a first end and a second end. The elongate body lies along a timing link longitudinal axis. In the embodiment shown, the timing link pivot axis is located centrally between the first end and the second end and perpendicular to the timing link longitudinal axis. The timing link 139 extends between the timing elements 136, 138. A first pin 148 is coupled to the first end of the elongate body and extends transversely through the elongate body relative to the longitudinal axis. A second pin 150 is coupled to the second end of the elongate body and extends transversely through the elongate body relative to the longitudinal axis. The first recess 140 is sized and shaped to receive the first pin 148 and the second recess 142 is sized and shaped to receive the second pin 150. The pins 148, 150 may also be referred to as first toggle arresting elements and the recesses 140, 142 may be referred to as complimentary second toggle arresting features wherein the first and second toggle arresting features cooperate to prevent undesired movement of the side rail 56 at the toggle point 94.

The side rail 56 defines a first slot 152 for receiving one end of the first pin 148 and a second slot 154 for receiving one end of the second pin 150. The slots 152, 154 are arcuate in shape to constrain the pins 148, 150 to move within their respective slots 152, 154. It is to be appreciated that the slots 152, 154 may assume any shape or size.

When the side rail 56 is at the toggle point 94 (FIG. 18A), the timing link 139 engages the timing elements 136, 138. In particular, the first recess 140 receives the first pin 148 and the second recess 142 receives the second pin 150. When engaged, the timing link 139 is configured to be parallel with the intermediate frame 36 at the toggle point 94. As the side rail 56 moves from the toggle point 94, the pins 148, 150 prohibit the timing elements 136, 138 from pivoting in opposite directions about their respective side rail pivot axes A, C. In this manner, the timing link 139 constrains the support arms 80, 82 to synchronously pivot about their respective pivot axes A, B, C, D, in the same direction. When the side rail 56 moves away from the toggle point 94 (FIG. 18B), the timing link 139 disengages from the timing elements 136, 138 and the pins 148, 150 fall outside of the recesses 140, 142 to ride on outer surfaces of the timing elements 136, 138 rendering the timing link 139 askew relative to the intermediate frame 36.

The timing mechanism 98 may further comprise a spring 156 coupled to the side rail 56 and the timing link 139. The spring 156 may be a tension spring having a first end fixed to the side rail 56 and a second end connected to the timing link 139 to normally bias the timing link 139 into a parallel relationship with the side rail 56. Accordingly, the spring 156 also assists in locating the pins 148, 150 in the recesses 140, 142 when the side rail 56 reaches the toggle point 94.

In an alternative embodiment, the timing elements 136, 138 are located to pivot about the frame pivot axes B, D. Likewise, the recesses 140, 142 are located to pivot about the frame pivot axes B, D in conjunction with the timing elements 136, 138. In this version, the timing link 139 is pivotally coupled to the intermediate frame 36. The intermediate frame 36 defines the slots 152, 154 for the pins 148, 150 and the timing link 139 is spring biased to engage the recesses 140, 142 at the toggle point 94.

Figure 19A:
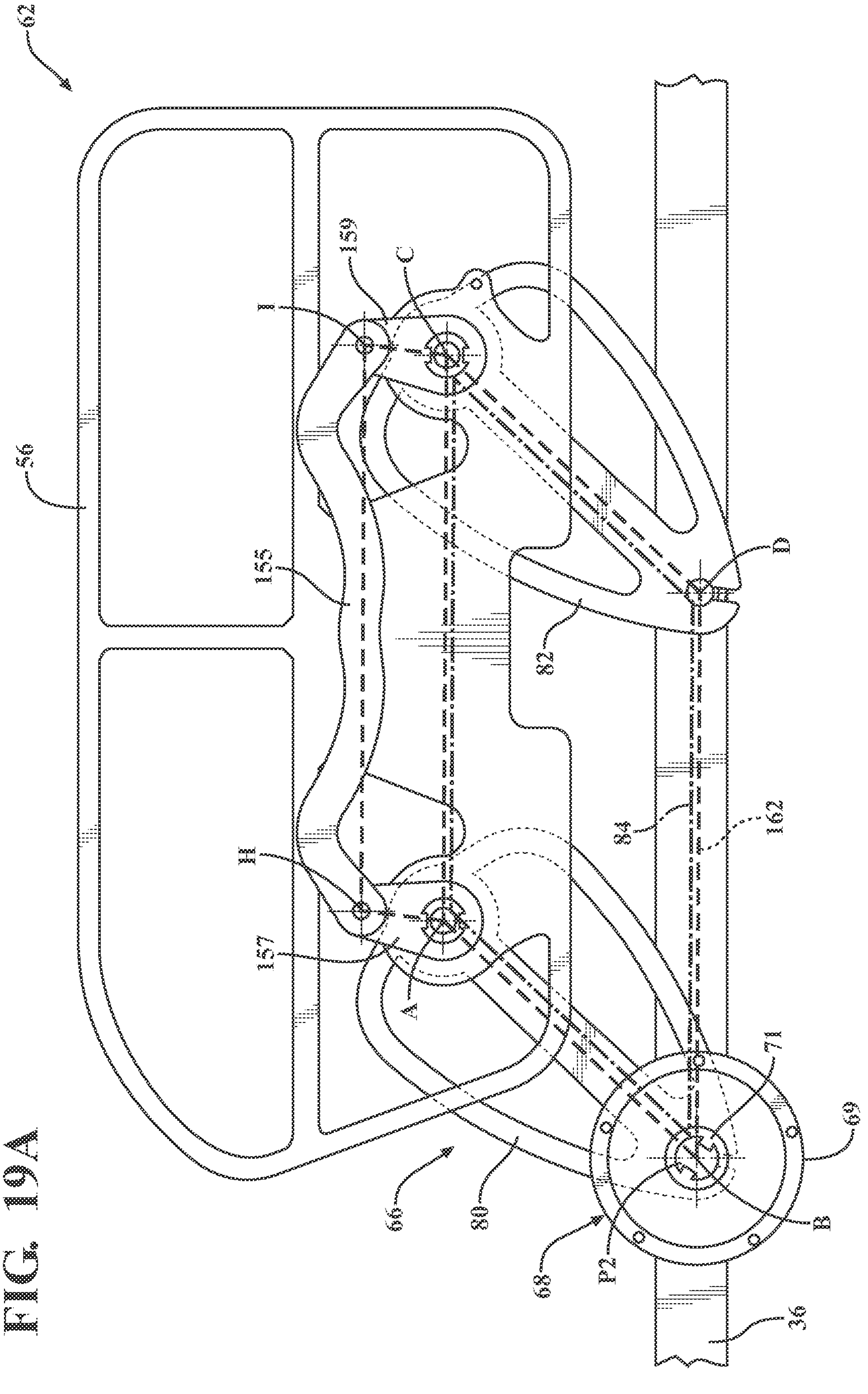
FIG. 19A is an elevational view illustrating another alternative timing link with a side rail in a first position.
Figure 19B:
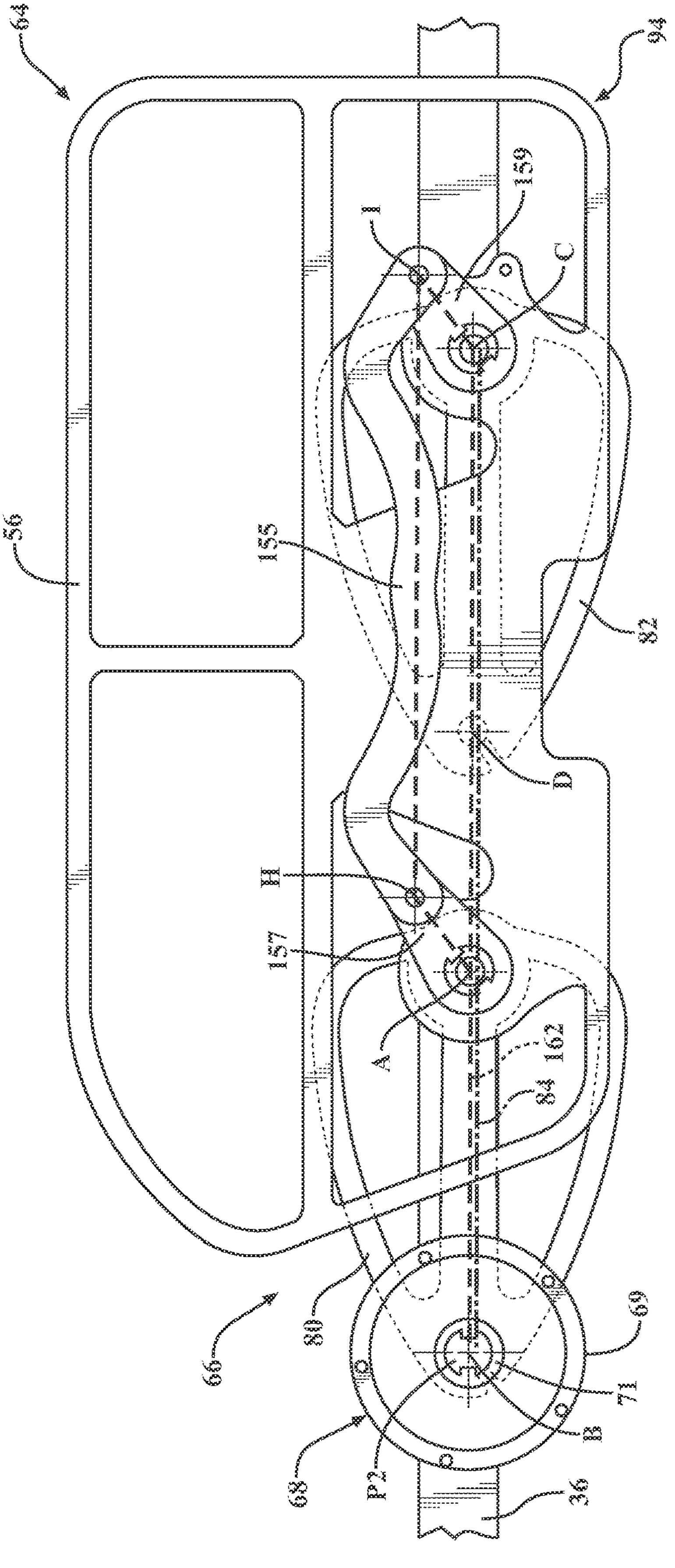
FIG. 19B is an elevational view illustrating the alternative timing link of FIG. 19A with the side rail in a second position.

Referring to FIGS. 19A and 19B, in another embodiment, the timing mechanism 98 comprises a timing link 155 and first and second timing arms 157, 159. The first timing arm 157 is an extension of the first support arm 80 and the second timing arm 159 is an extension of the second support arm 82. The timing link 155 is pivotally coupled at one end to the first timing arm 157 to pivot about a first link pivot axis H. The timing link 155 is pivotally coupled at an opposite end to the second timing arm 159 to pivot about a second link pivot axis I. The timing link 155 is arranged such that when the four bar mechanism 84, denoted by dashed lines, is at the toggle point 94, in which the pivot axis A, B, C, D share a single, common plane, the link pivot axes H, I are located outside of that single, common plane.

The timing link 155, intermediate frame 36, and support arms 80, 82 (including timing arms 157, 159) form a second four bar mechanism 162, denoted by dashed lines, with a second toggle point different from the toggle point 94 of the four bar mechanism 84. In this manner, when one of the four bar mechanisms 84, 162 is at its respective toggle point, the support arms 80, 82 are constrained to synchronously pivot in the same direction by whichever one of the four bar mechanisms 84, 162 is not at its respective toggle point.

In some embodiments when the side rail 56 is in the first position 62 (FIG. 19A), the four bar mechanism 84 is not at the toggle point 94, and the second four bar mechanism 162 is not at the second toggle point. When the side rail 56 is at the toggle point 94 (FIG. 19B), the four bar mechanism 84 is at the toggle point 94, and the second four bar mechanism 162 is not at the second toggle point.

In some embodiments, the controller 72 coordinates movement of one or more of the side rails 54, 56, 58, 60 in conjunction with operation of another powered device on the patient support apparatus 30. In other words, the side rails 54, 56, 58, 60 may be automated to move either simultaneously with operation of another powered device, or in a predetermined sequence with another powered device. Each of these powered devices may comprise their own actuator for performing their desired functions. Upon actuation of a user input device 74 or upon sensing a predetermined condition, the controller 72 may generate a command signal instructing one or more of the actuators 68 to raise or lower one or more of the side rails 54, 56, 58, 60, while at the same time generating a command signal to one or more actuators of the other powered devices to simultaneously, or sequentially, cause operation of the other powered devices.

Figure 20:
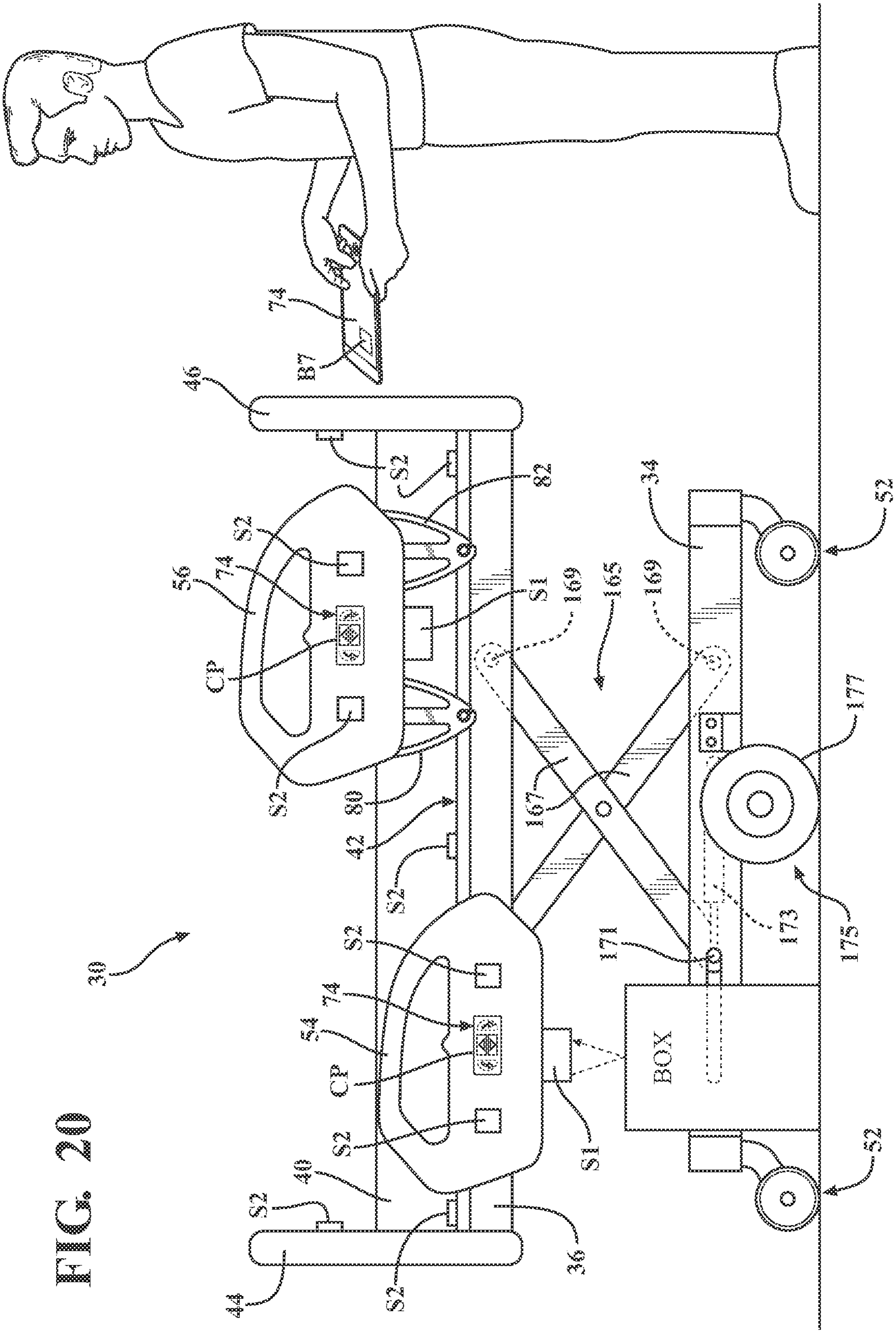
FIG. 20 is an elevational view of the patient support apparatus illustrating an alternative lift device and obstruction detection sensors.

Referring to FIG. 20, one such powered device comprises a lift device 165 configured to lift and lower the patient between minimum and maximum heights of the patient support apparatus 30, and intermediate positions therebetween. In the embodiment shown, the lift device 165 comprises a pair of lift arms 167 pivotally connected at a center thereof and arranged in a scissor-lift configuration. The lift arms 167 are movable to raise and lower the intermediate frame 36 relative to the base 34 and the floor surface. Each of the lift arms 167 have a first end pivotally connected at a fixed pivot point 169 to one of the base 34 and the intermediate frame 36. The lift arms 167 extend from the first end to a second end. A pin 171 is fixed to the second end of each of the lift arms 167 and arranged to slide in horizontal guide slots defined in the base 34 and the intermediate frame 36 (slot not shown in intermediate frame 36, but identical to the slot shown in the base 34).

An actuator 173 is fixed at one end to the base 34 and to one of the pins 171 at the other end. When actuated, the actuator 173 directly slides the pin 171 in the horizontal guide slot, which also indirectly slides the other pin 171 in the other horizontal guide slot, to raise and lower the patient support surface 42. The actuator 173 may comprise an electric linear actuator, a hydraulic cylinder, or similar driving mechanism. Suitable electric linear actuators are supplied by LINAK A/S located at Smedevenget 8, Guderup, DK-6430, Nordborg, Denmark. Other configurations of the lift device 165 are also possible, such as column lift mechanisms or linkage lift mechanisms.

In some embodiments, the controller 72 is configured to operate actuator 173 and one or more of the actuators 68 of the side rails 54, 56, 58, 60 in a coordinated manner so that one or more of the side rails 54, 56, 58, 60 are raised or lowered in coordination with operation of the lift device 165. For instance, the caregiver may actuate a user input device 74 associated with placing the patient support apparatus 30 in a transport condition. In that case, the user input device 74 transmits an input signal to the controller 72 (e.g., wirelessly) indicating that the caregiver wishes to transport the patient. The controller 72 then generates command signals to each of the actuators 68 to automatically raise all of the side rails 54, 56, 58, 60 and to the actuator 173 to fully lift the intermediate frame 36 and the patient support surface 42 to ease transport. The command signals may be sent simultaneously so that the actuators 68 and 173 operate simultaneously or the command signals may be sent in sequence so that the actuators 68 and 173 operate in sequence.

In another case, the caregiver may actuate a different user input device 74 (e.g., the egress button B7) associated with placing the patient support apparatus 30 in an egress configuration. In this case, the controller 72 coordinates operation of the actuators 68 and 173, either simultaneously or sequentially, so that the lift device 165 moves the patient support surface 42 to a lowered position and the actuators 68 move one or more of the side rails 54, 56, 58, 60 to the lowered positions and/or to re-oriented positions similar to that shown in FIG. 6 to facilitate egress. It should be appreciated that this configuration also facilitates ingress onto the patient support apparatus 30. The user input devices 74 employed to facilitate egress can thus be equally utilized to facilitate ingress. In other embodiments, depending on which of the side rails 54, 56, 58, 60 are raised or lowered, the controller 72 may automatically control the actuator 173 or other actuators described herein to place the patient support apparatus 30 in a configuration best suited for egress and/or ingress. For example, if both the foot end side rails 56, 60 are being lowered by the caregiver, a fowler section actuator (described below) may be automatically operated by the controller 72 to raise the fowler section to facilitate egress and/or ingress.

Other powered devices used on the patient support apparatus 30 comprise a pair of drive units 175 for powered transport of the patient support apparatus 30. The drive units 175 comprise drive motors connected to drive wheels 177 located on opposing sides of the base 34 (see FIG. 20). The drive motors rotate the drive wheels 177 for powered driving of the patient support apparatus 30. When a user input device 74 associated with the drive units 175 (e.g., a push button, force sensor, infrared sensor, or the like) is actuated by a user, the controller 72 automatically raises the side rails 54, 56, 58, 60 via the actuators 68 to reduce the potential for the patient to fall off the patient support surface 42 during transport. In some instances, the controller 72 may first receive input signals from sensors, such as load cells, located on the patient support apparatus 30 to determine if the patient is present. If the input signals indicate to the controller 72 that the patient is not present, then the controller 72 may not instruct the actuators 68 to move the side rails 54, 56, 58, 60 when the drive units 175 are operated. However, if the input signals indicate that the patient is present, the actuators 68 are commanded to automatically raise one or more of the side rails 54, 56, 58, 60.

The patient support apparatus 30 may comprise any number of powered devices for performing desired functions on the patient support apparatus 30. The powered devices may also comprise deck section adjustment devices, a bed length extension device, a bed width extension device, or other powered devices.

A sensing system may comprise one or more sensors S1, S2, S3, S4, S5 associated with operation of the actuators 68. The sensors S1, S2, S3, S4, S5 may be configured as user input devices to control operation of the actuators 68. The sensors S1, S2, S3, S4, S5 may be configured to sense conditions of the patient support apparatus 30 or conditions of the patient and transmit associated input signals to the controller 72. The sensors S1, S2, S3, S4, S5 may be part of the actuators 68 to sense loads or operational conditions of the actuators 68 and transmit associated input signals to the controller 72.

In one embodiment, as shown in FIG. 20, each of the side rails 54, 56, 58, 60 comprises a sensor S1 configured to detect an obstruction. The controller 72 is configured to control the actuators 68 in response to the sensors S1 detecting the obstruction. The sensors S1 could detect such obstructions during movement of the side rails 54, 56, 58, 60 via the actuators 68, when the side rails 54, 56, 58, 60 are being lifted or lowered by the lift device 165, or in other situations, such as when the fowler section is being raised or lowered. The sensors S1 may be one or more optical sensors, infrared sensors, torque sensors, force sensors, load cells, or ultrasonic sensors, or any other sensors capable of detecting obstructions.

In the embodiment illustrated in FIG. 20, a user is remotely actuating the lift device 165 to lower the intermediate frame 36 relative to the base 34. As the first side rail 54 approaches the floor surface, the sensor S1 will detect an obstruction (box under the first side rail 54). The sensor S1 sends an input signal to the controller 72 and the controller 72 controls the actuator 68 to raise the first side rail 54 to avoid the obstruction, while still lowering the intermediate frame 36. The actuator 68 will continue to raise the first side rail 54 to avoid the obstruction until the first side rail 54 is fully raised. At that point, if the obstruction is still present and unable to be avoided, the controller 72 will discontinue operation of the lift device 165.

In another embodiment, one or more sensors S2 enable the controller 72 to detect when the patient is approaching the patient support apparatus 30 and sends an input signal to the controller 72 to control the actuators 68 to move one or more of the side rails 54, 56, 58, 60 in a manner that will facilitate patient ingress into the patient support apparatus 30, such as raising or lowering one or more of the side rails 54, 56, 58, 60 and/or re-orienting one or more of the side rails 54, 56, 58, 60 (see, e.g., FIG. 5D) to make patient ingress easier.

Additionally, the sensors S2 may enable the controller 72 to detect the patient preparing for egress from the patient support apparatus 30 or ingress onto the patient support apparatus 30. The sensors S2 similarly transmit input signals to the controller 72 so that, upon determining that patient egress/ingress is imminent, the controller 72 causes the actuators 68 to automatically move one or more of the side rails 54, 56, 58, 60 in a manner to facilitate patient egress from the patient support apparatus 30 or ingress onto the patient support apparatus 30, such as raising or lowering one or more of the side rails 54, 56, 58, 60 and/or re-orienting one or more of the side rails 54, 56, 58, 60 (see, e.g., FIG. 5E) to make patient egress/ingress easier. The sensors S2 may be one or more optical sensors, infrared sensors, force sensors, an RFID reader, load cells, or ultrasonic sensors, or any other sensors capable of detecting that the patient is preparing for egress/ingress. In one embodiment, the sensors S2 may sense the presence of the patient by virtue of a tag attached to the patient, such as an RFID tag that is read by the sensors S2 to indicate that the patient assigned to that particular patient support apparatus 30 has returned.

Figure 21:
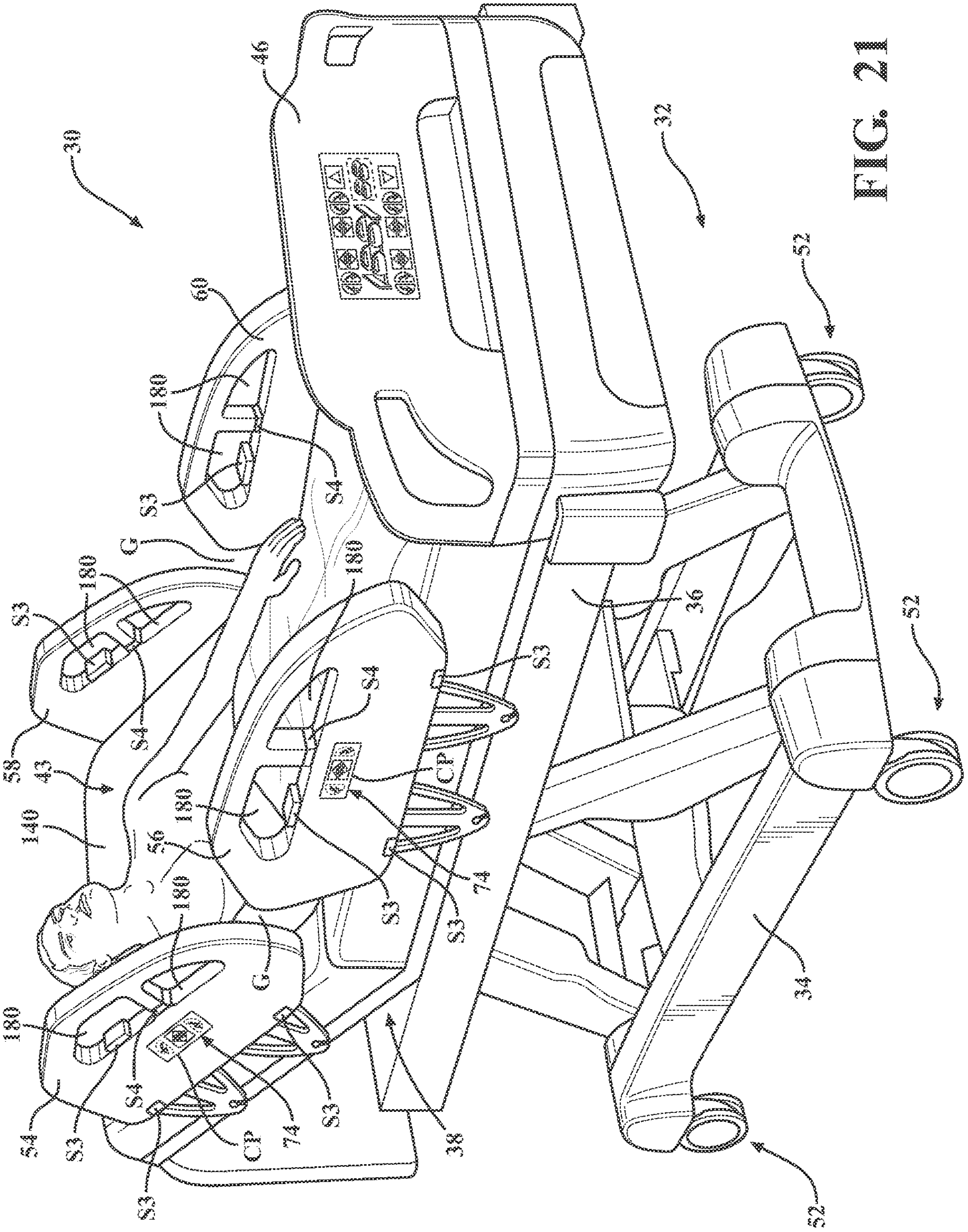
FIG. 21 is a perspective view of the patient support apparatus illustrating sensors for receiving user commands.

Referring to FIG. 21, sensors S3 may be configured as user input devices to transmit input signals to the controller 72 that indicate when the user, such as the caregiver, wishes to raise or lower the side rails 54, 56, 58, 60. In the embodiment shown, the sensors S3 comprise infrared sensors placed on the side rails 54, 56, 58, 60 to detect a user's hand, foot, or other part of the user's body. One of the sensors S3 is placed in an opening 180 in each of the side rails 54, 56, 58, 60 to detect the presence of the user's hand in the opening 180. When the user places his/her hand in the opening 180, and the sensor S3 detects the user's hand, a corresponding input signal is transmitted to the controller 72. The controller 72 responds by operating the associated actuator 68 to lower the side rail 54, 56, 58, 60. Similarly, sensors S3 associated with raising the side rail 54, 56, 58, 60 can be placed on an underside of the side rails 54, 56, 58, 60 to detect the presence of the user's hand beneath the side rail 54, 56, 58, 60, which signals to the controller 72 that the user wishes to raise the side rail 54, 56, 58, 60.

In further embodiments, a pair of the sensors S3 can be placed beneath each of the side rails 54, 56, 58, 60 in a spaced apart manner so that the user's foot can be placed under one of the sensors S3 to raise the side rail 54, 56, 58, 60 and the user's foot can be placed under the other of the sensors S3 to lower the side rail 54, 56, 58, 60. The sensors S3 may comprise one or more optical sensors, infrared sensors, sensors for recognizing gesture commands, ultrasonic sensors, or any sensors capable of generating input signals to raise or lower the side rails 54, 56, 58, 60. The sensors S3 could also be used to control any other function of the patient support apparatus 30 in response to touchless input from the user. Additionally, the sensors S3 may be placed at any suitable location on the patient support apparatus 30.

In another embodiment, sensors S4 are attached to the side rails 54, 56, 58, 60 to detect forces applied by the user in an upward or downward direction on the side rail 54, 56, 58, 60. The sensors S4 are configured as user input devices that transmit corresponding input signals to the controller 72 to cause operation of the actuators 68 to raise or lower the side rails 54, 56, 58, 60 as desired by the user. The controller 72 controls the actuators 68 to move the side rails 54, 56, 58, 60 in the direction of the forces applied to the side rails 54, 56, 58, 60 by the user. Accordingly, the sensors S4 are generally arranged to detect vertical components of forces applied by the user on the side rails 54, 56, 58, 60 relative to the floor. In some cases, the magnitude of the forces applied, or of the vertical component of the forces applied, must exceed a threshold magnitude in order to trigger movement of the side rails 54, 56, 58, 60. Otherwise, any leaning, casual touching, or similar contact with the side rails 54, 56, 58, 60 may cause unexpected movement of the side rails 54, 56, 58, 60. The sensors S4 may comprise one or more force sensors, force/torque sensors, or load cells, or any other sensors capable of determining a direction and/or magnitude of forces and/or torques being applied by the user on the side rails 54, 56, 58, 60.

In another embodiment, the actuators 68 comprise torque sensors S5 (see FIG. 4). The torque sensors S5 are configured to detect when the side rails 54, 56, 58, 60 make physical contact with an obstruction such as pinching the patient or other physical objects between the side rails 54, 56, 58, 60 and another part of the patient support apparatus 30. The torque sensors S5 transmit a corresponding input signal to the controller 72. In response to the input signal, the controller 72 controls the one or more actuators 68 to cease movement of the obstructed side rail 54, 56, 58, 60. Alternatively, the controller 72 can determine a direction in which the side rail 54, 56, 58, 60 can be moved to avoid the obstruction, based on the direction of the torque increase associated with the obstruction, and then only allow movement of side rail 54, 56, 58, 60 in that direction away from the obstruction. The torque sensors S5 may be separate sensors or circuits that correlate current drawn by the actuators 68 (e.g., motors) to torque.

The side rails 54, 56, 58, 60 can be moved in a manner that controls gaps and prevents pinch points between the side rails 54, 56, 58, 60 and/or other components of the patient support apparatus 30. For instance, referring to FIG. 21, gaps G between the head end side rails 54, 58 and the foot end side rails 56, 60 can be maintained regardless of adjustments of the patient support deck 38. In particular, while the fowler section of the patient support deck 38 is being raised to the position shown in FIG. 21, the head end side rails 54, 58 can be automatically actuated to move counterclockwise away from the foot end side rails 56, 60 to keep a minimum gap G. This control can be programmed into the controller 72 so that when a user input device 74 is actuated to raise or lower the fowler section, the controller 72 automatically operates the actuators 68 of the head end side rails 54, 58 so that the head end side rails 54, 58 move in coordination with movement of the fowler section to maintain the gaps G, e.g., to maintain a minimum distance between the head end side rails 54, 58 and the foot end side rails 56, 60. A fowler section actuator 145 (see FIG. 4) interconnects the fowler section and the intermediate frame 36. The controller 72 operates the fowler section actuator 145 to move the fowler section either simultaneously with movement of the head end side rails 54, 58, or sequentially after movement of the head end side rails 54, 58.

It should also be appreciated that the foot end side rails 56, 60 could likewise be automatically moved to maintain the gaps G or both the head end side rails 54, 58 and the foot end side rails 56, 60 could be moved in coordination with the fowler section to maintain the gaps G. Additionally, one or more of the side rails 54, 56, 58, 60 could be reoriented (see FIG. 6) and/or translated (see FIG. 6A) when raising or lowering the fowler section to control the gaps G. For instance, as the fowler section is raised, the foot end side rails 56, 60 could be automatically translated toward the foot end of the patient support apparatus 30 while the head end side rails 54, 58 remain stationary relative to the fowler section. Similarly, as the fowler section is raised, the foot end side rails 56, 60 could be reoriented as shown in FIG. 6 thereby keeping a minimum gap G between the head end side rails 54, 58 and the foot end side rails 56, 60 while at the same time facilitating easier egress for the patient.

Additionally, the gaps G can be controlled to maintain a minimum distance between the side rails 54, 56, 58, 60, or to simply prevent contact between the side rails 54, 56, 58, 60. Furthermore, in some embodiments, instead of maintaining constant gaps G, the gaps G can be controlled by actuating one or more of the side rails 54, 56, 58, 60 to increase or decrease the gaps G during movement of the fowler section or other sections. Gaps between any of the side rails 54, 56, 58, 60 and other components of the patient support apparatus 30 could likewise be controlled in the same manner described above.

In one embodiment, the actuators 68 are configured to engage the side rails 54, 56, 58, 60 in a manner that restricts the side rails 54, 56, 58, 60 from moving between the first 62 and second 64 positions under manual power. For instance, electromechanical devices 67 may comprise electromechanical brakes set to prevent manual movement of the side rails 54, 56, 58, 60. In some configurations, the electromechanical brakes are disengaged so that the side rails 54, 56, 58, 60 can be manually moved between positions by the user. In other configurations, the actuators 68 are sufficiently backdrivable such that the user may easily move any of the side rails 54, 56, 58, 60 manually between the first position 62 and the second position 64. In yet another configuration, the actuators 68 are configured to only raise the side rails 54, 56, 58, 60 and the user must still manually lower the side rails 54, 56, 58, 60 with the assistance of gravity.

Figure 22:
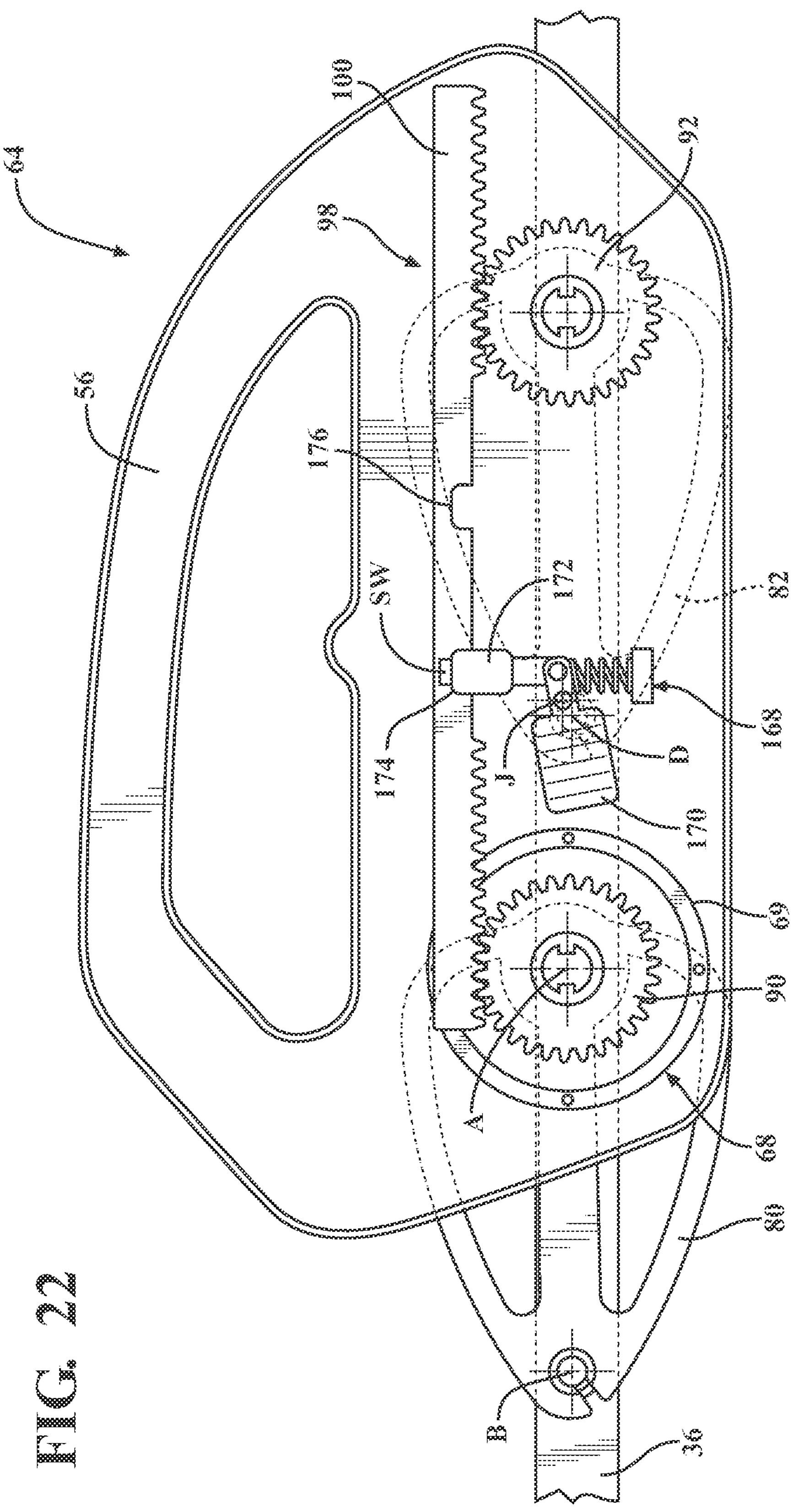
FIGS. 22 and 23 are elevational views of a locking system for a side rail illustrating the side rail in different positions.
Figure 23:
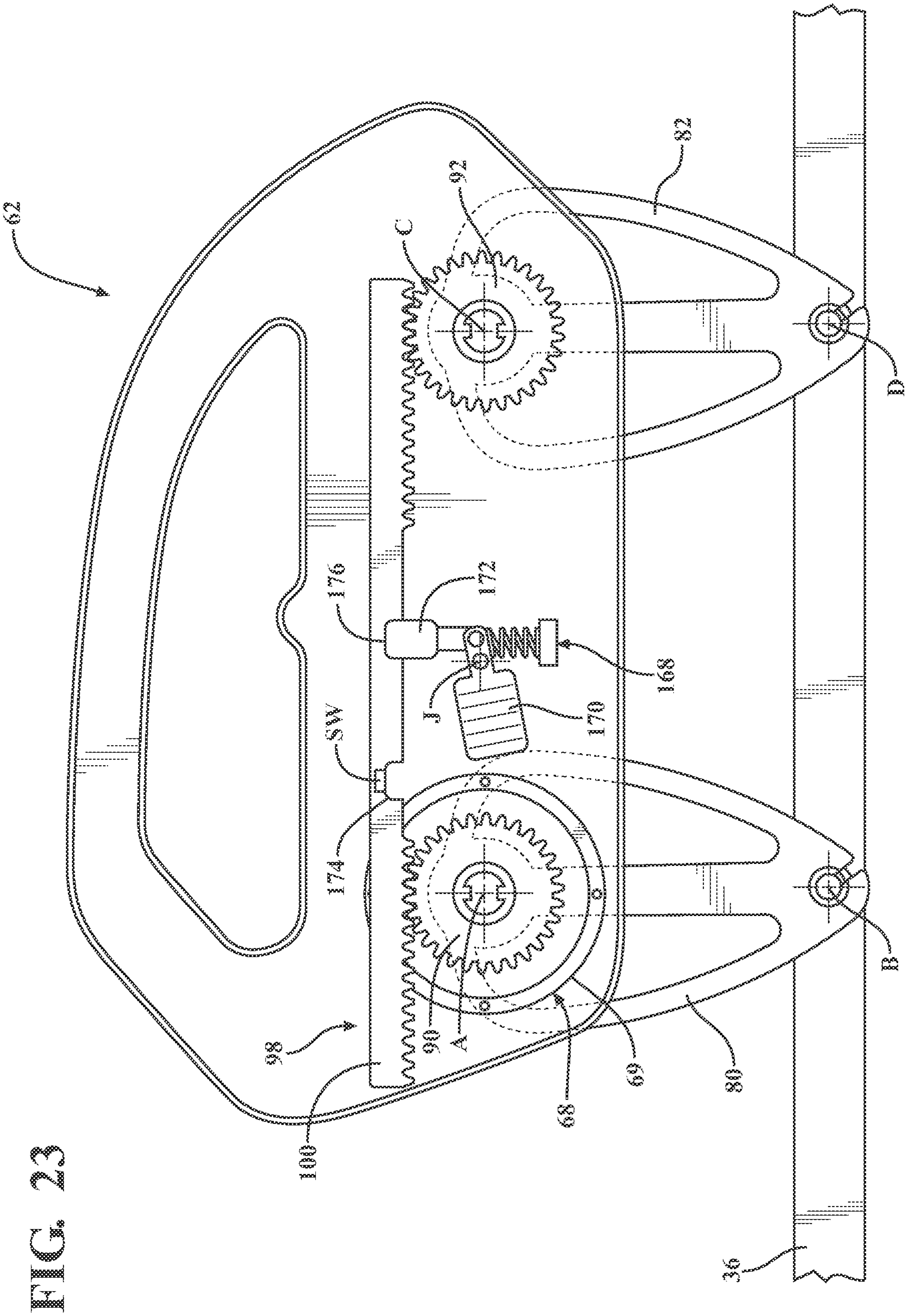

Referring to FIGS. 22 and 23, a locking system 168 is shown for locking the side rail 56 in the first position 62 and the second position 64. Although not shown, the locking system 168 could be configured to lock the side rail 56 in one or more intermediate positions as well. The locking system 168 shown is useful for any of the configurations described immediately above in which there is a need to ensure that the side rail 56 is locked from movement aside from any restrictions to movement provided by the actuators 68.

The locking system 168 comprises a latch 172 movably coupled to the side rail 56. In the embodiment shown, the latch 172 is configured to engage the timing link 100 to restrict the timing link 100 from moving relative to the side rail 56. Fixing the timing link 100 restricts movement of the side rail 56. A handle 170 is configured to move the latch 172 into and out of engagement with the timing link 100. The handle 170 is disposed on an exterior side of the side rail 56 and is available to the user for easy actuation. The latch 172 is biased into engagement with the timing link 100 and selectively movable out of engagement in response to the user manually moving the handle 170, e.g., by lifting the handle 170 to pivot the handle 170 about the handle pivot axis J.

The timing link 100 further comprises a first recess 174 and a second recess 176 into which the latch 172 engages the timing link 100. In the second position 64 (FIG. 22), the latch 172 engages the first recess 174 to lock the side rail 56 in the second position 64. In the first position 62 (FIG. 23), the latch 172 engages the second recess 176 to lock the side rail 56 in the first position 62. It is to be appreciated that the timing link 100 could comprise any number of recesses corresponding to any number of positions between the first position 62 and the second position 64 of the side rail 56.

In the embodiments in which the actuators 68 are merely used to assist the users with raising the side rails 54, 56, 58, 60, but not with lowering the side rails 54, 56, 58, 60, the side rail 56 can be readily lowered under the influence of gravity until the latch 172 engages the first recess 174. Additionally, a switch SW may be located in the first recess 174 to act as an input device that transmits an input signal (closed or open state) to the controller 72 to enable the controller 72 to determine when the user wishes to raise the side rail 56. For instance, if the switch SW is configured to close when the latch 172 locks in the first recess 174, the controller 72 can determine that the side rail 56 is in the second position 64 (FIG. 22). When the controller 72 next sees an open condition of the switch, the controller 72 will know that the user is likely disengaging the latch 172 from the first recess 174 to raise the side rail 56. Accordingly, the controller 72 can automatically operate the actuator 68 to assist the user in raising the side rail 56.

In some versions, the actuator 68 employed may not have enough power to raise the side rail 56 on its own, but provides assistance to the user to reduce the work needed to raise the side rail 56. In other versions, biasing devices (not shown) may be employed to further assist with raising the side rail 56. Such biasing devices may comprise gas springs or similar devices that, either alone, or along with the actuator 68, provide additional work to raise the side rail 56.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient support apparatus for supporting a patient, said patient support apparatus comprising:

- a support structure;
- a side rail movable relative to said support structure between a raised position and a lowered position, said side rail comprising an interior;
- a support arm assembly coupling said side rail to said support structure, said support arm assembly including:
  - a first support arm pivotally coupled to said side rail about a first side rail pivot axis and pivotally coupled to said support structure about a first frame pivot axis, and
  - a second support arm spaced from said first support arm, said second support arm pivotally coupled to said side rail about a second side rail pivot axis and pivotally coupled to said support structure about a second frame pivot axis;
- an actuator disposed at least partially within said interior of said side rail and configured to move said side rail between said raised position and said lowered position;
- an input device for generating an input signal; and
- a controller in communication with said actuator and said input device and configured to receive said input signal from said input device to control said actuator based on said input signal.

2. The patient support apparatus of claim 1, wherein said actuator is coupled to said first support arm to move said first support arm to effect movement of said side rail between said raised position and said lowered position.

3. The patient support apparatus of claim 1, wherein said actuator engages one of said support arms to pivot said one of said support arms to move said side rail between said raised position and said lowered position.

4. The patient support apparatus of claim 3, wherein said actuator is coupled to said first support arm.

5. The patient support apparatus of claim 4, further comprising a second actuator coupled to said second support arm to move said second support arm relative to said support structure to move said side rail between said raised position and said lowered position.

6. The patient support apparatus of claim 5, wherein said side rail is movable relative to said support structure between a first orientation and a second orientation, said actuators configured to move said side rail between said first and second orientations.

7. The patient support apparatus of claim 6, wherein said side rail comprises a handle for user egress and wherein said handle changes orientation as said side rail is moved between said first and second orientations.

8. The patient support apparatus of claim 1, further comprising a timing mechanism for synchronizing movement of said first and second support arms as said side rail moves between said raised position and said lowered position.

9. The patient support apparatus of claim 8, wherein said timing mechanism comprises a timing link movably coupled to said side rail and disposed in a meshing relationship with said support arm assembly.

10. The patient support apparatus of claim 9, wherein said actuator engages said timing link to move said side rail between said raised position and said lowered position.

11. The patient support apparatus of claim 9, wherein said timing link comprises a gear train having at least one gear.

12. The patient support apparatus of claim 8, wherein said timing mechanism comprises a chain.

13. The patient support apparatus of claim 8, wherein said timing mechanism comprises a belt.

14. The patient support apparatus of claim 8, wherein said support arm assembly comprises a first gear fixed to said first support arm and a second gear fixed to said second support arm, and said timing mechanism is disposed in a meshing relationship with said gears.

15. The patient support apparatus of claim 1, further comprising a second actuator coupled to said second support arm, with said second actuator being in communication with said controller, wherein said actuator coupled to said first support arm is further defined as a first actuator, and wherein said controller is configured to operate said first and second actuators independently to move said first and second support arms in opposite directions to orient said side rail to an egress position different from said lowered position.

16. The patient support apparatus of claim 15, wherein said second actuator is disposed at least partially within said interior of said side rail.

* * * * *